United States Patent
Cao et al.

(10) Patent No.: US 11,930,521 B2
(45) Date of Patent: Mar. 12, 2024

(54) INTERFERENCE MITIGATION FOR REMOTE DEVICES

(71) Applicant: Qualcomm Incorporated, San Diego, CA (US)

(72) Inventors: Yiqing Cao, Beijing (CN); Wanshi Chen, San Diego, CA (US); Yuwei Ren, Beijing (CN); Chenxi Hao, Beijing (CN); Huilin Xu, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 323 days.

(21) Appl. No.: 17/276,813

(22) PCT Filed: Oct. 7, 2019

(86) PCT No.: PCT/CN2019/109843
§ 371 (c)(1),
(2) Date: Mar. 16, 2021

(87) PCT Pub. No.: WO2020/083017
PCT Pub. Date: Apr. 30, 2020

(65) Prior Publication Data
US 2021/0274511 A1 Sep. 2, 2021

(30) Foreign Application Priority Data

Oct. 25, 2018 (WO) ................ PCT/CN2018/111899

(51) Int. Cl.
*H04W 72/541* (2023.01)
*H04W 24/10* (2009.01)
(Continued)

(52) U.S. Cl.
CPC ......... *H04W 72/541* (2023.01); *H04W 24/10* (2013.01); *H04W 72/0446* (2013.01);
(Continued)

(58) Field of Classification Search
CPC ..... H04W 52/24; H04W 92/20; H04W 16/14; H04W 68/12; H04W 88/14; H04W 92/12; H04W 72/0446
See application file for complete search history.

(56) References Cited

U.S. PATENT DOCUMENTS

| 8,730,861 B2 | 5/2014 | Montojo et al. |
| 9,420,606 B2 | 8/2016 | Bhushan et al. |

(Continued)

FOREIGN PATENT DOCUMENTS

| CN | 108347286 A | 7/2018 |
| WO | 2011163201 | 12/2011 |

(Continued)

OTHER PUBLICATIONS

International Search Report and Written Opinion—PCT/CN2018/111899—ISA/EPO—dated Mar. 7, 2019.
(Continued)

*Primary Examiner* — Tu X Nguyen
(74) *Attorney, Agent, or Firm* — Holland & Hart LLP

(57) ABSTRACT

The described techniques relate to improved methods, systems, devices, and apparatuses that support interference mitigation for remote devices. A first wireless device (e.g., a base station) may detect remote interference with its communications caused by a second wireless device (e. g., a second, remote base station) based on, for example, a measured interference over thermal noise level exceeding a threshold. The first wireless device may identify a set of time-frequency resources for remote interference reference signals and a data transmission for a user equipment (UE)
(Continued)

that is in communication with the first wireless device. The first wireless device may transmit a remote interference signal to a second wireless device (e. g., a second base station) via the set of time-frequency resources. The first wireless device may further signal a resource allocation to the UE for the UE to use for transmitting uplink transmissions to the first wireless device.

30 Claims, 25 Drawing Sheets

(51) Int. Cl.
*H04W 72/0446* (2023.01)
*H04W 72/0453* (2023.01)
*H04W 72/1263* (2023.01)
*H04W 88/14* (2009.01)

(52) U.S. Cl.
CPC ... *H04W 72/0453* (2013.01); *H04W 72/1263* (2013.01); *H04W 88/14* (2013.01)

(56) References Cited

U.S. PATENT DOCUMENTS

| | | | |
|---|---|---|---|
| 10,015,776 | B2 | 7/2018 | Hosseini et al. |
| 2011/0081865 | A1* | 4/2011 | Xiao ................... H04L 1/06 455/63.1 |
| 2014/0233669 | A1 | 8/2014 | Aggarwal et al. |
| 2015/0237646 | A1 | 8/2015 | Huang |

FOREIGN PATENT DOCUMENTS

| | | |
|---|---|---|
| WO | WO-2012087464 A1 | 6/2012 |
| WO | WO-2015199942 | 12/2015 |
| WO | 2017155607 | 9/2017 |

OTHER PUBLICATIONS

International Search Report and Written Opinion—PCT/CN2019/109843—ISA/EPO—dated Jan. 6, 2020.

LG Electronics: "Discussion on Reference Signal Design for NR RIM Support", 3GPP TSG RAN WG1 Meeting #94bis, R1-1810292, Chungdu, China, Oct. 12, 2018 (Oct. 12, 2018), pp. 1-8.

Ericsson: "On Mechanism for Identifying Strong gNB Interferers", 3GPP Draft, 3GPP TSG-RAN WG1 Meeting #94, Tdoc R1-1808823 on Mechanisms for Identifying Strong gNB Interferers, 3rd Generation Partnership Project (3GPP), Mobile Competence Centre, 650, Route Des Lucioles, F-06921 Sophia-Antipolis CE, vol. RAN WG1, No. Goteborg, Sweden, Aug. 20, 2018-Aug. 24, 2018, Aug. 10, 2018 (Aug. 10, 2018), XP051516196, 6 Pages, Retrieved from the Internet: URL: http://www.3gpp.org/ftp/tsg%5Fran/WG1%5FRL1/TSGR1%5F94/Docs/R1%2D1808823%2Ezip [retrieved on Aug. 10, 2018] Section 4.2, paragraphs [0001], [0002], section 4.2, 1 Introduction, 2 Discussion on necessity of identifying gNB aggressors, 3 Reference signal transmission principles, 4 Requirements and design possibilities for RIM reference signal.

Qualcomm Incorporated: "Mechanisms for Identifying Strong gNB Interferers", 3GPP Draft, 3GPP TSG RAN WG1 Meeting #94, R1-1809456_Mechanisms for Identifying Strong GNB Interferers, 3rd Generation Partnership Project (3GPP), Mobile Competence Centre, 650, Route Des Lucioles, F-06921 Sophia-Antipolis Cedex, France, vol. RAN WG1, Aug. 17, 2018 (Aug. 17, 2018), pp. 1-3, XP051516821, Gothenburg, Sweden, Aug. 20-Aug. 24, 2018, Retrieved from the Internet: URL: http://www.3gpp.org/ftp/tsg_ran/WG1_RL1/TSGR1_94/Docs/R1-1809456.zip, [retrieved on Aug. 17, 2018], paragraphs [0001], [0002], Figure 1: Remote interference collides with PRACH, UE assisted interference detection, 3 Reference Signal Design, Proposal 1.

Supplementary European Search Report—EP19876183—Search Authority—Munich—dated Jun. 10, 2022.

* cited by examiner

INTERFERENCE MITIGATION FOR REMOTE DEVICES

CROSS REFERENCE TO RELATED APPLICATIONS

The present application is a 371 national phase filing of International Patent Application No. PCT/CN2019/109843 by Cao et al., entitled "INTERFERENCE MITIGATION FOR REMOTE DEVICES," filed Oct. 7, 2019; and to International Patent Application No. PCT/CN2018/111899 by Cao et al., entitled "INTERFERENCE MITIGATION FOR REMOTE DEVICES," filed Oct. 25, 2018, which are assigned to the assignee hereof, and which are each incorporated by reference herein in their entirety.

BACKGROUND

The following relates generally to wireless communications, and more specifically to interference mitigation for remote devices.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code-division multiple access (CDMA), time-division multiple access (TDMA), frequency division multiple access (FDMA), orthogonal FDMA (OFDMA), or discrete Fourier transform-spread-orthogonal frequency division multiplexing (DFT-s-OFDM). A wireless multiple-access communications system may include a number of base stations or network access nodes, each simultaneously supporting communication for multiple communication devices, which may be otherwise known as user equipment (UE).

A base station in a wireless communications system may support communications for one or more UEs within and around the edge of a coverage area associated with the base station. In some cases, a signal transmitted by a remote base station (e.g., a base station several 100 kilometers (km) away from the base station) may cause interference at the base station. For instance, a downlink signal transmitted by the remote base station may result in interference with uplink signal(s) received at the base station. Further, neighboring base stations or UEs may also cause interference (e.g., in the form of cross-link interference).

SUMMARY

The described techniques relate to improved methods, systems, devices, and apparatuses that support interference mitigation for remote devices. The described techniques may be performed by a transmitting wireless device (e.g., a transmitting base station), a receiving wireless device (e.g., a receiving base station), and/or a user equipment (UE) in wireless communication with one of the transmitting wireless device or the receiving wireless device. A first wireless device (e.g., the transmitting wireless device or the receiving wireless device) may be an aggressor causing the remote interference on a second wireless device, which may be referred to as a victim.

The described techniques provide for a first wireless device to be capable of detecting interference based on, for example, a measured interference over thermal noise level exceeding a threshold. The interference may be from a second wireless device, which may be a neighboring or remote device (e.g., a cell supported by a neighboring base station). The first wireless device may identify a set of time-frequency resources for remote interference reference signals as well as a data transmission for a UE that is in communication with the first wireless device. The first wireless device may then transmit a remote interference signal via the set of time-frequency resources. The first wireless device may further signal a resource allocation to the UE for the UE to use for uplink transmissions to the first wireless device. In some cases, the first wireless device may signal the resource allocation using rate matching signaling such that the first wireless device does not allocate the set of time-frequency resources the first wireless device may use for transmissions.

DETAILED DESCRIPTION

Figure 1:
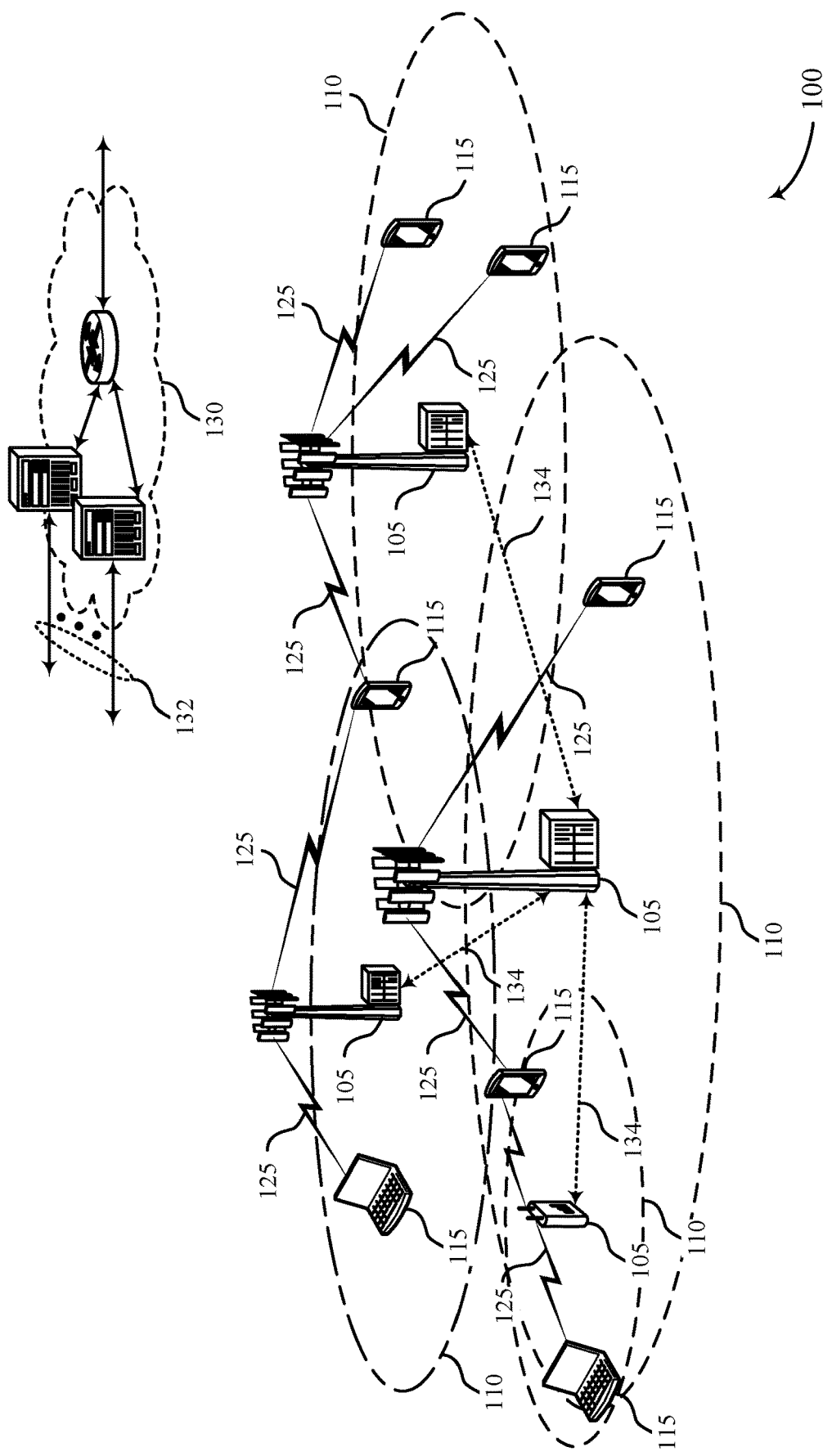
FIG. 1 illustrates an example of a wireless communications system that supports interference mitigation for remote devices in accordance with various aspects of the present disclosure.

A wireless communications system may include a first base station, a second base station, one or more user equipment (UE), and a network controller. A base station experiencing interference from another base station may be referred to as a victim base station, while a base station causing interference may be referred to as an aggressor base station. In some cases, transmissions from the aggressor base station may interfere with communications to the victim base station. For example, downlink transmissions from the aggressor base station (or other signaling transmitted by the aggressor base station) may be transmitted with a relatively high transmit power and may more likely to interfere with, for example, uplink transmissions to the victim base station from various UEs.

Base stations may communicate using time-division duplexing (TDD), where TDD configurations for the aggressor base station and the victim base station may be synchronized (i.e., aligned) in time. In some cases, downlink transmissions from the aggressor base station may be transmitted with sufficient transmit power that the downlink transmissions may be detected by the victim base station after a delay due to the distance between the aggressor base station and the victim base station. This delay may cause the downlink transmissions from the aggressor base station to overlap or interfere with, for example, uplink transmissions to be received by the victim base station from one or more UEs. This interference may be referred to as remote interference and may hinder communications between the victim base station and one or more respective UEs.

Techniques are described herein to reduce the impact of such remote interference. These techniques may be implemented when the victim base station and/or the aggressor base station detects interference. The base stations may detect interference, for example, based on a measured interference over thermal noise level exceeding a threshold (e.g., the threshold based on a standard interference over thermal noise level) or via another interference detection procedure.

When a victim base station detects interference (e.g., due to atmospheric ducting at a time of day or time of the year at which atmospheric ducting may substantially affect wireless communications), the victim base station may transmit one more remote interference reference signals to the aggressor base station. The remote interference signals may alert the aggressor base station of the detected interference.

When the aggressor base station receives the remote interference signals from the victim base station, the aggressor base station may estimate the distance separating the aggressor base station and the victim base station. Based on the estimated distance, the aggressor base station may determine a duration for one or more back-off symbols during which the aggressor base station may mute (i.e., not transmit during) downlink transmissions. By not transmitting during the back-off symbols, the aggressor base station increases a duration of time during which the aggressor base station is neither transmitting downlink transmissions nor receiving uplink transmissions from UEs. In doing so, the aggressor base station's downlink transmissions may be received by the victim base station during a period during which no communications are performed with the victim base station. The aggressor base station may further transmit one or more remote interference reference signals to the victim base station including an indication of the determined back-off symbols. This process may be repeated to refine the duration of the back-off symbols, for example, until the aggressor base station's downlink transmission do not interfere with communications with the victim base station.

In some cases, the base stations may transmit the remote interference signals (e.g., remote interference reference signals) using a portion of the corresponding radio frequency spectrum bandwidth a respective channel used for transmissions. When the remote interference signals occupy a portion less than the entirety of the radio frequency spectrum bandwidth, the remaining frequency resources of the channel may be allocated to communications with UEs to improve resource utilization.

Techniques are provided herein for the base stations to signal a resource allocation to UEs such that communications with the UE do not interfere with the remote interference signals. In some cases, a transmitting bases station may signal such a resource allocation to its corresponding UEs using rate matching signaling such that the transmitting base station does not allocate the time and frequency resources the base station itself (or other neighboring base stations) may use for transmissions. Further, a receiving base station may also avoid scheduling the frequency and time resources with a receive power larger than a threshold value.

According to the techniques provided herein, the base stations may reserve a set of time and frequency resources for remote interference reference signals. Additionally or alternatively, a transmitting base station may receive an indication (e.g., from a central controller or a core network node) of time and frequency resources allocated for remote interference reference signals. In other examples, the transmitting base station may detect the available resources (e.g., via energy detection or using measurement reports from a UE). Based on the indicated or detected resources, the transmitting base station may perform rate matching for its corresponding UEs.

In some aspects, a receiving base station may receive an indication (e.g., from a central controller or a core network node) of time and frequency resources allocated for remote interference reference signals. In other examples, the receiving base station may detect the available resources (e.g., via energy detection or using measurement reports from a UE). Based on the indicated or detected resources, the receiving base station may receive the remote interference signal using the indicated or detected resources and schedule the remaining non-occupied resources for other communications with one or more UEs.

Aspects of the disclosure are initially described in the context of a wireless communications system. Aspects are then described with respect to communication schemes and a process flow. Aspects of the disclosure are further illustrated by and described with reference to apparatus diagrams, system diagrams, and flowcharts that relate to interference mitigation for remote devices.

FIG. 1 illustrates an example of a wireless communications system 100 that supports interference mitigation for remote devices in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency spectrum bands, for example, in the range of 300 megahertz (MHz) to 300 gigahertz (GHz). The region from 300 MHz to 3 GHz may be known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency spectrum bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data.

In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency-division duplexing (FDD), TDD, or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at some orientations with respect to an antenna array experience constructive interference while others experience destructive interference. The adjustment of signals communicated via the antenna elements may include a transmitting device or a receiving device applying amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency spectrum band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an Evolved Universal Terrestrial Radio Access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple subcarriers (e.g., using multi-carrier modulation (MCM) techniques such as orthogonal frequency division multiplexing (OFDM) or discrete Fourier transform-spread-OFDM (DFT-s-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time-division multiplexing (TDM) techniques, frequency-division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

As mentioned above, a base station 105 may communicate with one or more UEs 115 within a respective geographic coverage area 110. In some cases, downlink transmissions from a base station 105 may only be detectable by UEs 115 within or around the edge of the respective geographic coverage area 110. In other cases, however, downlink transmissions from the base station 105 may be detectable beyond the geographic coverage area 110 of the base station 105. For instance, the downlink transmissions may be detectable at distances substantially larger than a coverage range of the geographic coverage area 110 (e.g., at distances of several hundred kilometers (km)) due to, for example, atmospheric ducting and reflections from mountains, ocean surfaces, and clouds. In such cases, downlink transmissions from the base station 105 may interfere with communications between another base station 105 and one or more UEs 115. Such interference may be referred to as remote interference. In some cases, some remote interference (e.g., atmospheric ducting) may occur only at some times of the day and/or some days of the calendar year. Additionally, local interference may be caused by neighboring wireless devices. For example, communications between neighboring UEs 115 and base stations 105 may cause cross-link interference with the downlink transmissions from the first base station 105.

Figure 2:
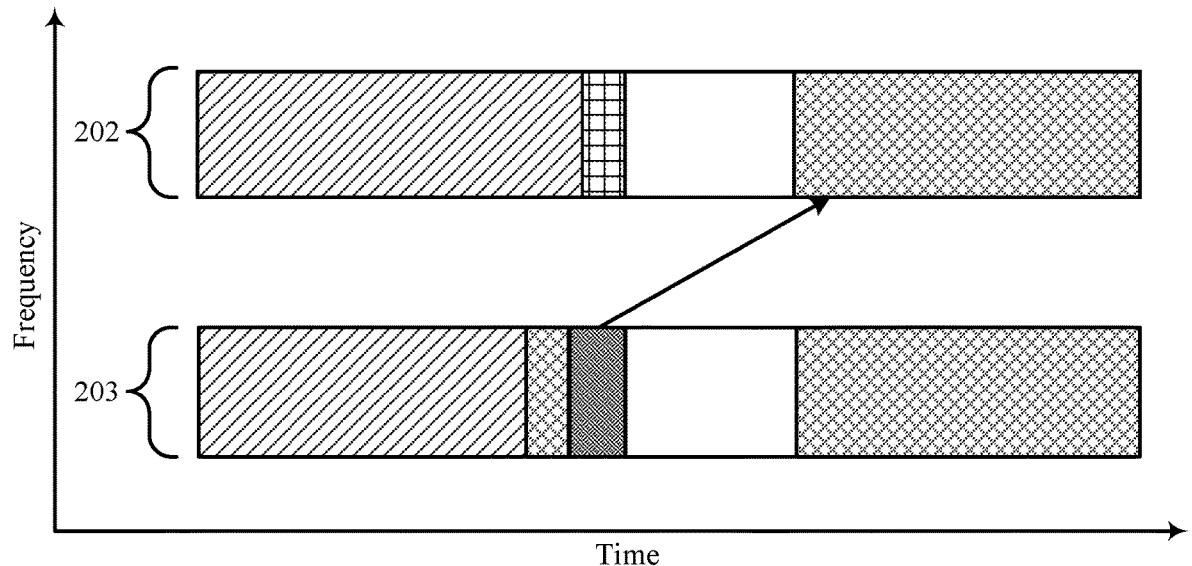
FIGS. 2 through 5 illustrate example communication schemes that support interference mitigation for remote devices in accordance with various aspects of the present disclosure.
Figure 2:
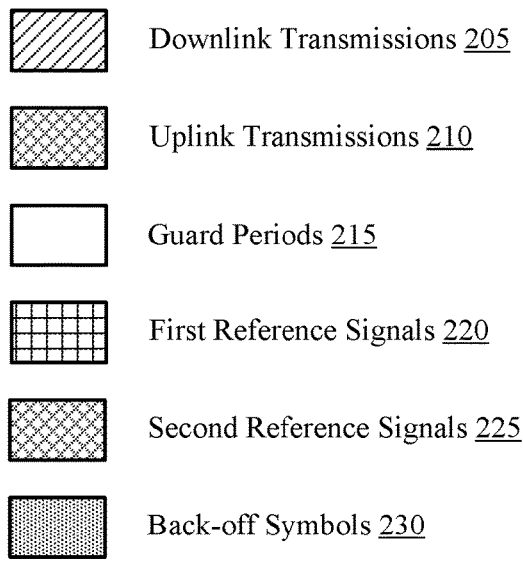

FIG. 2 illustrates an example of a communication scheme 200 that supports interference mitigation for remote devices in accordance with various aspects of the present disclosure. In some examples, communication scheme 200 may implement aspects of the wireless communications system 100, as described with reference to FIG. 1. The communication scheme 200 shows a first transmission timeline for communications on a first channel 202 using a first radio frequency spectrum bandwidth and a second transmission timeline on a second channel 203 using a second radio frequency spectrum bandwidth. The first transmission timeline and the second transmission timeline show communications between corresponding base stations and UEs, which may be examples of the corresponding devices as described with reference to FIG. 1.

In the example communication scheme 200 shown in FIG. 2, the first transmission timeline shows communications to and from a victim base station and the second transmission timeline shows communications to and from an aggressor base station. The first transmission timeline and the second transmission timeline show time periods during which the respective victim and aggressor base stations may transmit downlink transmission 205 to corresponding UEs and time periods during which the respective victim and aggressor base stations may receive uplink transmissions 210 from the UEs. In some cases, the downlink transmissions 205 and the uplink transmissions 210 may be separated by guard periods 215, as shown in the example communication scheme 200. As described herein, transmissions to and from the aggressor base station may interfere with communications to and from the victim base station. For example, downlink transmissions 205 transmitted by the aggressor base station may be transmitted with a relatively high transmit power and may be more likely to interfere with, for example, uplink transmissions 210 to the victim base station from various UEs, which may be transmitted with a lower transmit power compared to the downlink transmissions 205 from the aggressor base station.

In the example of FIG. 2, the base stations may communicate using TDD, where, in some cases, TDD configurations for the first transmission timeline and the second transmission timeline may be synchronized. In some cases the first and second transmission timelines may not be synchronized. In some cases, downlink transmissions 205 from the aggressor base station may be transmitted with sufficient transmit power that the downlink transmissions 205 may be detected by the victim base station after a delay due to the distance between the aggressor base station and the victim base station. This delay may cause the downlink transmissions 205 from the aggressor base station to overlap and interfere (i.e., cause remote interference) with, for example, a portion of the uplink transmissions 210 to be received by the victim base station from one or more UEs.

Such remote interference may hinder communications between the victim base station and one or more respective UEs. Due to the interference, the victim base station may be unable to efficiently receive uplink data from a UE, or the UE may be unable to synchronize with the victim base station (e.g., using a random access procedure). For example, downlink transmissions from an aggressor base station that is greater than 100 km from the victim base station and that are transmitted with sufficient power to be detected may be received multiple symbols later in time than they were transmitted. Thus, when the first transmission timeline and the second transmission timeline are synchronized, the downlink transmissions 205 from the aggressor may be received, for example, during the time period allocated for the victim base station to receive uplink transmissions 210.

Further, the victim base station may be similarly impacted by interference from other base stations (e.g., in addition to interference from the first aggressor base station). Such interference may cause relatively reduced throughput for the victim base station. Additionally, in some cases (e.g., in TDD communications systems), a wireless channel may be reciprocal between the transmitter and the receiver. As such, both cells (e.g., on the receiver and on the transmitter) may cause interference with each other.

In some cases, the interference may be symmetric, in which case the cells may interfere with each other equally (e.g., if the victim base station and the aggressor base station transmit downlink transmissions with substantially similar transmit powers). In the symmetric case, the victim base station may be the aggressor node at other times, and vice versa, as both base stations may transmit downlink transmissions with sufficient transmit to cause interference with uplink transmission received at the respective base station. Alternatively, the interference may be asymmetric, in which case one cell may experience stronger interference than the other cell (e.g., the aggressor base station may transmit downlink transmissions with a relatively higher transmit power than the victim base station).

A framework may be provided to reduce the impact of remote interference, as illustrated by the communication scheme 200. The communication scheme 200 may be implemented via over-the-air transmissions and/or via backhaul signaling between the victim base station and the aggressor base station. These techniques may be implemented based on certain criteria such as when the victim base station and/or the aggressor base station detects interference (or, a relatively increased level of interference relative to a baseline level of interference). The base stations may detect interference, for example, based on a measured interference over thermal noise level exceeding a defined threshold (the threshold based on, e.g., a normal interference over thermal noise level) or via another interference detection procedure.

When the victim base station detects interference (e.g., due to atmospheric ducting at a time of day and/or time of the year at which atmospheric ducting may substantially affect wireless communications), the victim base station may transmit one more first reference signals 220 (e.g., one or more remote interference reference signals) to the aggressor base station. For example, with reference to the first transmission timeline, the victim base station may detect interference in one or more received downlink transmissions 205 and transmit the first reference signals 220 to the aggressor base station following the downlink transmissions 205. The first reference signals 220 may alert the aggressor base station to the detected interference.

When the aggressor base station receives the first reference signals 220 from the victim base station (e.g., during the time period in which the aggressor base station receives the downlink transmissions 205), the aggressor base station may estimate the distance separating the aggressor base station and the victim base station. Based on the estimated distance, the aggressor base station may determine a duration for one or more back-off symbols 230 during which the aggressor base station may mute (i.e., not transmit during) one or more corresponding downlink symbols. By not transmitting downlink transmission 205 during the back-off symbols 230, the aggressor base station increases the duration of the guard period 215 between transmitting downlink transmissions 205 and the time at which uplink transmission 210 are to be received. In doing so, the aggressor base station's downlink transmissions may be detected at the victim base station during the guard period 215 and not interfere with the first downlink transmissions 205 following the guard period 215 (as indicated by the arrow in FIG. 2).

The aggressor base station may transmit one more second reference signals 225 (e.g., one or more remote interference reference signals) to the victim base station including an indication of the determined back-off symbols 230. As shown in the second transmission timeline, the back-off symbols 230 follow the time period during which the aggressor base station transmits the second reference signals 225 and is then followed by the guard period 215. This process may be repeated to refine (e.g., continue to increase) the duration of the back-off symbols 230, for example, until the aggressor base station's downlink transmission 205 are detected entirely within the victim base station's guard period 215.

In some cases, the base stations may transmit the first reference signals 220 and/or the second reference signals 225 using a portion of the corresponding radio frequency spectrum bandwidth of the first channel 202 and/or the second channel 203. When the first reference signals 220 and the second reference signals 225 occupy a portion less than the entirety of the radio frequency spectrum bandwidth, the remaining frequency resources of the first channel 202 and the second channel 203 may be allocated to communications with UEs to improve resource utilization.

Techniques are provided herein for the base stations to signal a resource allocation to their corresponding UEs such that communications with the UE do not interfere with the first reference signals 220 transmitted from the victim base station to the aggressor base station or the second reference signals transmitted from the aggressor base station to the victim base station. In some cases, a transmitting bases station (i.e., the victim base station transmitting the first reference signals 220 and/or the aggressor base station transmitting the second reference signals 225) may signal such a resource allocation to its corresponding UEs using rate matching signaling such that the transmitting base station does not allocate the time and frequency resources the base station itself (or other neighboring base stations) may use for transmissions. Further, a receiving base station (i.e., the aggressor base station receiving the first reference signals 220 and/or the victim base station receiving the second reference signals 225) may also avoid scheduling the frequency and time resources with a receive power (e.g., reference signal received power (RSRP)) larger than a threshold value.

According to the techniques provided herein, in some cases, the base stations may reserve time and frequency resources for remote interference reference signals. Additionally or alternatively, a transmitting base station may receive an indication from a central controller or a core network node of the time and frequency resources allocated for transmitting remote interference reference signals. In some examples, the transmitting base station may detect the available resources (e.g., via energy detection or using measurement reports from the UE). Based on the indicated or detected resources, the transmitting base station may perform rate matching for its corresponding UEs.

A receiving base station may receive an indication from a central controller or a core network node of the time and frequency resources allocated for remote interference reference signals. In some examples, the receiving base station may detect the available resources (e.g., via energy detection or based on measurement reports from a UE). Based on the indicated or detected resources, the receiving base station may receive the reference signal using the indicated or detected resources and schedule the remaining non-occupied resources for other communications with its corresponding UEs.

Figure 3:
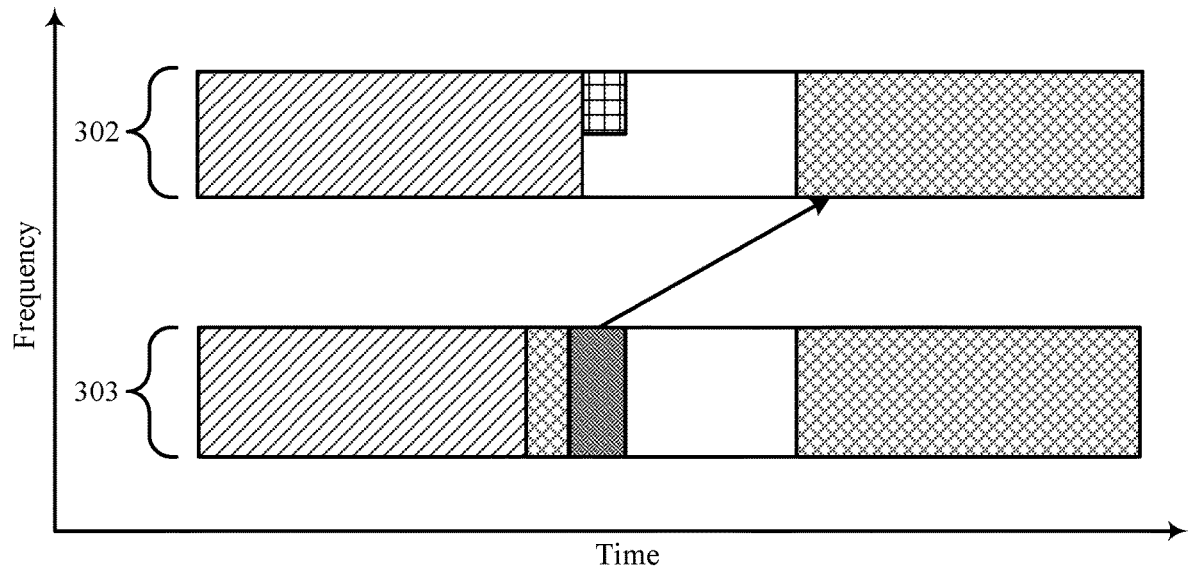

FIG. 3 illustrates an example of a communication scheme 300 that supports interference mitigation for remote devices in accordance with various aspects of the present disclosure. In some examples, communication scheme 300 may implement aspects of the wireless communications system 100, as described with reference to FIG. 1. The communication scheme 300 shows a first transmission timeline for communications on a first channel 302 using a first radio frequency spectrum bandwidth and a second transmission timeline on a second channel 303 using a second radio frequency spectrum bandwidth. The first transmission timeline and the second transmission timeline show communications between corresponding base stations and UEs, which may be examples of the corresponding devices as described with reference to FIG. 1.

In the example communication scheme 300 shown in FIG. 3, the first transmission timeline shows communications to and from a victim base station and the second transmission timeline shows communications to and from an aggressor base station. The first transmission timeline and the second transmission timeline show time periods during which the respective victim and aggressor base stations may transmit downlink transmission 305 to corresponding UEs and time periods during which the respective victim and aggressor base stations may receive uplink transmissions 310 from the UEs. In some cases, the downlink transmissions 305 and the uplink transmissions 310 may be separated by guard periods 315, as shown in the example communication scheme 300. The communications to and from the aggressor base station may cause interference with communications to and from the victim base station. For example, downlink transmissions 305 transmitted by the aggressor base station may be transmitted with a relatively high transmit power and may be more likely to interfere with, for example, uplink transmissions to the victim base station from various UEs transmitted with a lower transmit power compared to the downlink transmissions 205 from the aggressor base station.

The communication scheme 300 shown in FIG. 3 may reduce the impact of remote interference in which time and frequency resources are reserved for one or more first reference signals 320 (e.g., one or more remote interference reference signals), which may be transmitted from the victim base station to the aggressor base station. The communication scheme 300 also include resource reserved for one or more second reference signals 325 (e.g., one or more remote interference reference signals) to be transmitted from the aggressor base station to the victim base station (e.g., in response to the first reference signals 320).

When the victim base station detects interference (e.g., by identifying that a measured normal interference over thermal noise level exceeds a defined threshold), the victim base station may transmit the first reference signals 320 to the aggressor base station. For example, with reference to the first transmission timeline, the victim base station may detect interference in one or more received downlink transmissions 305 and transmit the first reference signals 320 to the aggressor base station following the downlink transmissions 305. The first reference signals 320 may alert the aggressor base station of the detected interference.

As shown in FIG. 3, the victim base station may transmit the first reference signal 320 using frequency and time resources that the victim base station expects and/or are scheduled to be available. For example, in the time domain, the victim base station may transmit the first reference signal 320 during the guard period 315 after transmitting other downlink transmissions 305 to UEs and before the upcoming time period during which the victim base station expects to receive corresponding uplink transmissions 310 from the UEs. In some cases, the victim base station may reserve multiple symbol periods (e.g., two symbols) for transmitting the first reference signal 320. In the frequency domain, the victim base station may reserve one or more frequency subbands of the total radio frequency spectrum bandwidth of the first channel 302. For example, as shown in the example communication scheme 300 of FIG. 3, the victim base station reserves subbands making up a portion, but less than the entirety, of the total radio frequency spectrum bandwidth of the first channel 302 on which the victim base station may transmit the first reference signals 320 to the aggressor base station.

In some examples, when the aggressor base station receives the first reference signals 320 from the victim base station (e.g., during the time period in which the aggressor base station receives the downlink transmissions 305), the aggressor base station may estimate the distance separating the aggressor base station and the victim base station. Based on the estimated distance, the aggressor base station may determine a duration for one or more back-off symbols 330 during which the aggressor base station may mute (i.e., not transmit during) one or more corresponding downlink symbols. By not transmitting downlink transmission 305 during the back-off symbols 330, the aggressor base station increases the duration of the guard period 315 between transmitting downlink transmissions 305 and the time at which uplink transmission 310 are to be received. In doing so, the aggressor base station's downlink transmissions may be detected at the victim base station during the guard period 315 and not interfere with the first downlink transmissions 305 following the guard period 315 (as indicated by the arrow in FIG. 3).

The aggressor base station may transmit one more second reference signals 325 to the victim base station including an indication of the determined back-off symbols 330. As shown in the second transmission timeline, the back-off symbols 330 follow the time period during which the aggressor base station transmits the second reference signals 325 and is then followed by the guard period 315. This process may be repeated to refine (e.g., decrease or increase) the duration of the back-off symbols 330, for example, until the aggressor base station's downlink transmission 305 are detected entirely within the victim base station's guard period 315.

Figure 4:
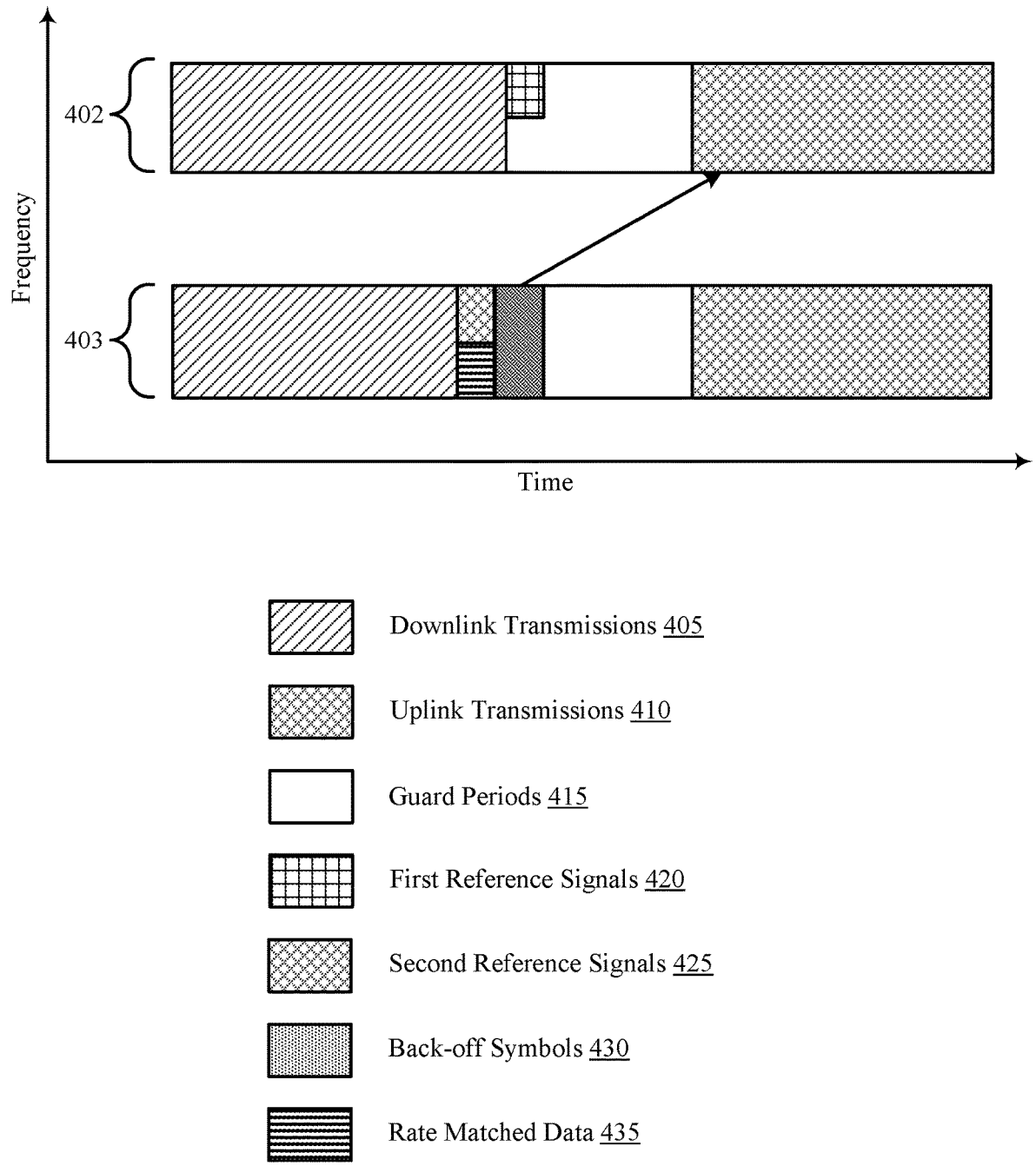

FIG. 4 illustrates an example of a communication scheme 400 that supports interference mitigation for remote devices in accordance with various aspects of the present disclosure. In some examples, communication scheme 400 may implement aspects of the wireless communications system 100, as described with reference to FIG. 1. The communication scheme 400 shows a first transmission timeline for communications on a first channel 402 using a first radio frequency spectrum bandwidth and a second transmission timeline on a second channel 403 second a first radio frequency spectrum bandwidth. The first transmission timeline and the second transmission timeline show communications between corresponding base stations and UEs, which may be examples of the corresponding devices as described with reference to FIG. 1.

In the example communication scheme 400 shown in FIG. 4, the first transmission timeline shows communications to and from a victim base station and the second transmission timeline shows communications to and from an aggressor base station. The first transmission timeline and the second transmission timeline show time periods during which the respective victim and aggressor base stations may transmit downlink transmission 405 to corresponding UEs and time periods during which the respective victim and aggressor base stations may receive uplink transmissions 410 from the UEs. In some cases, the downlink transmissions 405 and the uplink transmissions 410 may be separated by guard periods 415, as shown in the example communication scheme 400. The communications to and from the aggressor base station may cause interference with communications to and from the victim base station. For example, downlink transmissions 405 transmitted by the aggressor base station may be transmitted with a relatively high transmit power and may be more likely to interfere with, for example, uplink transmissions to the victim base station from various UEs transmitted with a lower transmit power compared to the downlink transmissions 205 from the aggressor base station.

The communication scheme 400 shown in FIG. 4 may reduce the impact of remote interference as time and frequency resources may be reserved for one or more first reference signals 420 (e.g., one or more remote interference reference signals) to be transmitted from the victim base station to the aggressor base station and for one or more second reference signals 425 (e.g., one or more remote interference reference signals) to be transmitted from the aggressor base station to the victim base station. When the victim base station detects interference (e.g., by identifying that a measured normal interference over thermal noise level exceeds a defined threshold), the victim base station may transmit the first reference signals 420 to the aggressor base station. For example, with reference to the first transmission timeline, the victim base station may detect interference in one or more received downlink transmissions 405 and transmit the first reference signals 420 to the aggressor base station following the downlink transmissions 405. The first reference signals 420 may alert the aggressor base station of the detected interference.

In the illustrative example of FIG. 4, the victim base station may transmit the first reference signal 420 using frequency and time resources that the victim base station expects and/or are scheduled to be available. For example, in the time domain, the victim base station may transmit the first reference signal 420 during the guard period 415 after transmitting other downlink transmissions 405 to UEs and before the upcoming time period during which the victim base station expects to receive corresponding uplink transmissions 410 from the UEs.

In some cases, a transmitting base station may receive an indication from a central controller of a resource utilization including time and frequency resources allocated for transmitting remote interference reference signals. In some cases, the central controller may be located at one of the base stations (e.g., located at the transmitting base station) or at a node of a core network. The central controller may determine time and frequency resources to be used for remote interference reference signals and may indicate these resources to the transmitting or the receiving base station. The central controller may also similarly indicate time and frequency resources that are not available (e.g., resources that are occupied by transmissions from other base stations). Additionally or alternatively, the transmitting base station may detect the available resources (e.g., via energy detection) and schedule the remote interference signal transmissions using the detected resources. For example, if the central controller does not schedule the resources to be used for remote interference reference signals or indicate these resources to the transmitting base station, the transmitting base station may determine to perform an energy detection procedure (e.g., following a wait time) with which the transmitting base station may detect a set of available resources. The transmitting base station may then signal the detected resources to schedule these resources for remote interference reference signals, for example, between itself and the receiving base station. Similarly, the receiving base station may identify that that the central controller has not scheduled resources for remote interference reference signals, and the receiving base station may determine to detect available resources (e.g., via an energy detection procedure) and may transmit a signal to schedule the remote interference signal transmissions using the detected resources. Additionally or alternatively, one or more UEs in communications with the transmitting base station may perform measurements of radio frequency spectrum that may have been configured or indicated to be potentially available (e.g., of first channel 402 or second channel 403). By sensing via energy detection and/or signaling detection, the UE may determine that some time and frequency resources may or may not be available for remote interference reference signals, and the UE may transmit a report to the transmitting or receiving base station that indicates the resources that are available and/or the resources that are not available.

Based on the indicated or detected resources, the transmitting base station may schedule (e.g., perform rate matching) communications for one or more UEs. For example, the transmitting base station may signal to the UEs (e.g., via RRC or downlink control information (DCI) signaling) an indication of the scheduling or rate matching (e.g., including the frequency and time resources that the transmitting base station may use to transmit the interference reference signals) and also may transmit rate matched data 435. The rate matching indication may be applicable and effective for multiple slots (e.g., two or more consecutive slots). That is, the transmitting base station may perform transmissions using the same resources, according to the rate matched data 435, across different instances in different (e.g., consecutive) slots.

In some cases, the victim base station may reserve multiple symbol periods (e.g., two symbols) for transmitting the first reference signal 420. In the frequency domain, the victim base station may reserve one or more RBs of the total radio frequency spectrum bandwidth of the first channel 402. For example, as shown in the example communication scheme 400 of FIG. 4, the victim base station reserves subbands making up a portion, but less than the entirety, of the total radio frequency spectrum bandwidth of the first channel 402 on which the victim base station may transmit the first reference signals 420 to the aggressor base station.

When the aggressor base station receives the first reference signals 420 from the victim base station (e.g., during the time period in which the aggressor base station receives the downlink transmissions 405), the aggressor base station may estimate the distance separating the aggressor base station and the victim base station. Based on the estimated distance, the aggressor base station may determine a duration for one or more back-off symbols 430 during which the aggressor base station may mute (i.e., not transmit during) one or more corresponding downlink symbols. By not transmitting downlink transmission 405 during the back-off symbols 430, the aggressor base station increases the duration of the guard period 415 between downlink transmissions 405 and the time at which uplink transmission 410 are to be received. In doing so, the aggressor base station's downlink transmissions may be detected at the victim base station during the guard period 415 and not interfere with the first downlink transmissions 405 following the guard period 415 (as indicated by the arrow in FIG. 4).

The aggressor base station may transmit one more second reference signals 425 to the victim base station including an indication of the determined back-off symbols 430. As shown in the second transmission timeline, the back-off symbols 430 follow the time period during which the aggressor base station transmits the second reference signals 425 and is then followed by the guard period 415. This process may be repeated to refine (e.g., continue to increase or decrease) the duration of the back-off symbols 430, for example, until the aggressor base station's downlink transmission 405 are detected entirely within the victim base station's guard period 415.

In some cases, the aggressor base station may reserve multiple symbol periods (e.g., two symbols) for transmitting the second reference signal 425 to the victim base station. In the frequency domain, the aggressor base station may reserve one or more RBs of the total radio frequency spectrum bandwidth of the second channel 403. For example, as shown in the example communication scheme 400 of FIG. 4, the aggressor base station reserves subbands making up a portion, but less than the entirety, of the total radio frequency spectrum bandwidth of the second channel 403 on which the aggressor base station may transmit the second reference signals 425 to the aggressor base station. As shown in FIG. 4, the remainder of the frequency resources of the second channel 403 may be used to transmit further downlink transmissions 405 to UEs in communication with the aggressor base station, thus providing for relatively improved frequency and time resource utilization.

Figure 5:
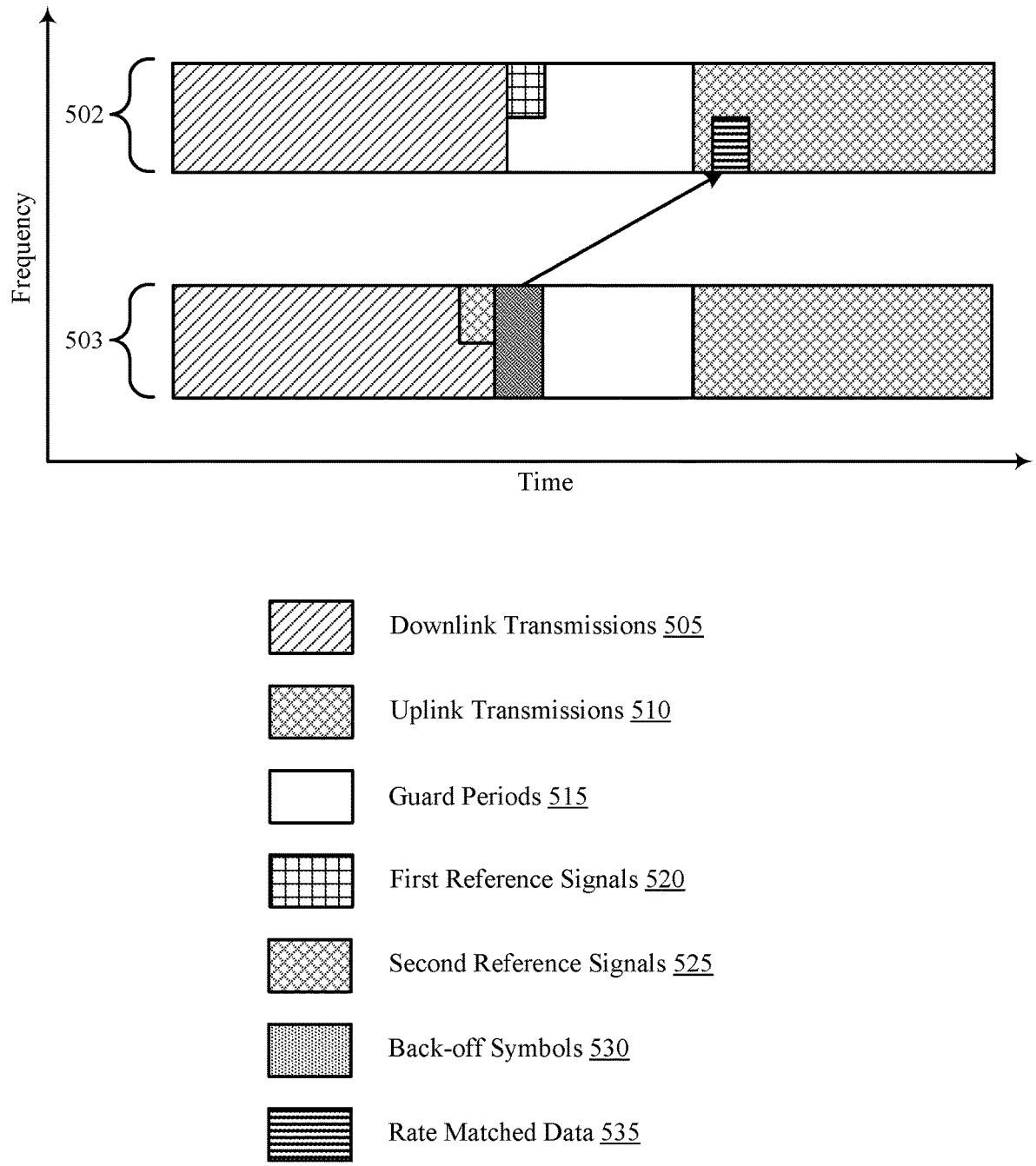

FIG. 5 illustrates an example of a communication scheme 500 that supports interference mitigation for remote devices in accordance with various aspects of the present disclosure. In some examples, communication scheme 500 may implement aspects of the wireless communications system 100, as described with reference to FIG. 1. The communication scheme 500 shows a first transmission timeline for communications on a first channel 502 using a first radio frequency spectrum bandwidth and a second transmission timeline on a second channel 503 second a first radio frequency spectrum bandwidth. The first transmission timeline and the second transmission timeline show communications between corresponding base stations and UEs, which may be examples of the corresponding devices as described with reference to FIG. 1.

In the example communication scheme 500 shown in FIG. 5, the first transmission timeline shows communications to and from a victim base station and the second transmission timeline shows communications to and from an aggressor base station. The first transmission timeline and the second transmission timeline show time periods during which the respective victim and aggressor base stations may transmit downlink transmission 505 to corresponding UEs and time periods during which the respective victim and aggressor base stations may receive uplink transmissions 510 from the UEs. In some cases, the downlink transmissions 505 and the uplink transmissions 510 may be separated by guard periods 515, as shown in the example communication scheme 500. The communications to and from the aggressor base station may cause interference with communications to and from the victim base station. For example, downlink transmissions 505 transmitted by the aggressor base station may be transmitted with a relatively high transmit power and may be more likely to interfere with, for example, uplink transmissions to the victim base station from various UEs transmitted with a lower transmit power compared to the downlink transmissions 205 from the aggressor base station.

The communication scheme 500 shown in FIG. 5 may reduce the impact of remote interference where time and frequency resources are reserved for one or more first reference signals 520 (e.g., one or more remote interference reference signals) to be transmitted from the victim base station to the aggressor base station and for one or more second reference signals 525 (e.g., one or more remote interference reference signals) to be transmitted from the aggressor base station to the victim base station. When the victim base station detects interference (e.g., by identifying that a measured normal interference over thermal noise level exceeds a defined threshold), the victim base station may transmit the first reference signals 520 to the aggressor base station. For example, with reference to the first transmission timeline, the victim base station may detect interference in one or more received downlink transmissions 505 and transmit the first reference signals 520 to the aggressor base station following the downlink transmissions 505. The first reference signals 520 may alert the aggressor base station of the detected interference.

The victim base station may transmit the first reference signal 520 using frequency and time resources that the victim base station expects and/or are scheduled to be available. For example, in the time domain, the victim base station may transmit the first reference signal 520 during the guard period 515 after transmitting other downlink transmissions 505 to UEs and before the upcoming time period during which the victim base station expects to receive corresponding uplink transmissions 510 from the UEs.

In the example of FIG. 5, the receiving base station may receive an indication from a central controller of a resource utilization including time and frequency resources allocated for remote interference reference signals. In some cases, the central controller may be located at one of the base stations (e.g., located at the receiving base station) or at a node of the core network. The central controller may determine time and frequency resources to be used for remote interference reference signals and indicate these resources to the receiving base station. The central controller may also similarly indicate time and frequency resources that are not available (e.g., resources that are occupied by transmissions from other base stations). Additionally or alternatively, the receiving base station may detect the available resources (e.g., via energy detection). Further, one or more UEs in communications with the receiving base station may perform measurements of first channel 502 or second channel 503. By sensing first channel 502 or second channel 503 via energy detection and/or signaling detection), the UE may determine time and frequency resources that may or may not be available for remote interference reference signals. In some aspects, the UE may transmit a report to the receiving base station indicating the resources that are available and/or the resources that are not available.

Based on the indicated or detected resources, the receiving base station may schedule (e.g., perform rate matching) communications for one or more UEs. For example, the receiving base station may signal to the UEs (e.g., via RRC or DCI signaling) an indication of the scheduling or rate matching (e.g., including the frequency and time resources that the receiving base station may use to receive the interference reference signals from the transmitting base station) and may also transmit rate matched data 535. The rate matching indication may be applicable and effective for multiple slots (e.g., two or more consecutive slots). That is, the receiving base station may receive transmissions using the same resources, according to the rate matched data 535, across different instances in different (e.g., consecutive) slots.

In some cases, the receiving base station may reserve multiple symbol periods (e.g., two symbols) for receiving transmission from the transmitting base station. For example, as shown in FIG. 5, the victim base station may mute frequency and time resources of the uplink transmissions 510 for receiving the rate matched data 535. In the frequency domain, the victim base station may reserve one or more RBs of the total radio frequency spectrum bandwidth of the first channel 502. As shown in FIG. 5, the remainder of the frequency resources of the first channel 502 may be used to receiving further uplink transmissions 510 from corresponding UEs, thus providing for relatively improved frequency and time resource utilization.

When the aggressor base station receives the first reference signals 520 from the victim base station (e.g., during the time period in which the aggressor base station receives the downlink transmissions 505), the aggressor base station may estimate the distance separating the aggressor base station and the victim base station. Based on the estimated distance, the aggressor base station may determine a duration for one or more back-off symbols 530 during which the aggressor base station may mute (i.e., not transmit during) one or more corresponding downlink symbols. By not transmitting downlink transmission 505 during the back-off symbols 530, the aggressor base station increases the duration of the guard period 515 between downlink transmissions 505 and the time at which uplink transmission 510 are to be received. In doing so, the aggressor base station's downlink transmissions may be detected at the victim base station during the guard period 515 and not interfere with the first downlink transmissions 505 following the guard period 515 (as indicated by the arrow in FIG. 5).

The aggressor base station may transmit one more second reference signals 525 to the victim base station including an indication of the determined back-off symbols 530. As shown in the second transmission timeline, the back-off symbols 530 follow the time period during which the aggressor base station transmits the second reference signals 525 and is then followed by the guard period 515. This process may be repeated to refine (e.g., continue to increase or decrease) the duration of the back-off symbols 530, for example, until the aggressor base station's downlink transmission 505 are detected entirely within the victim base station's guard period 515.

Figure 6:
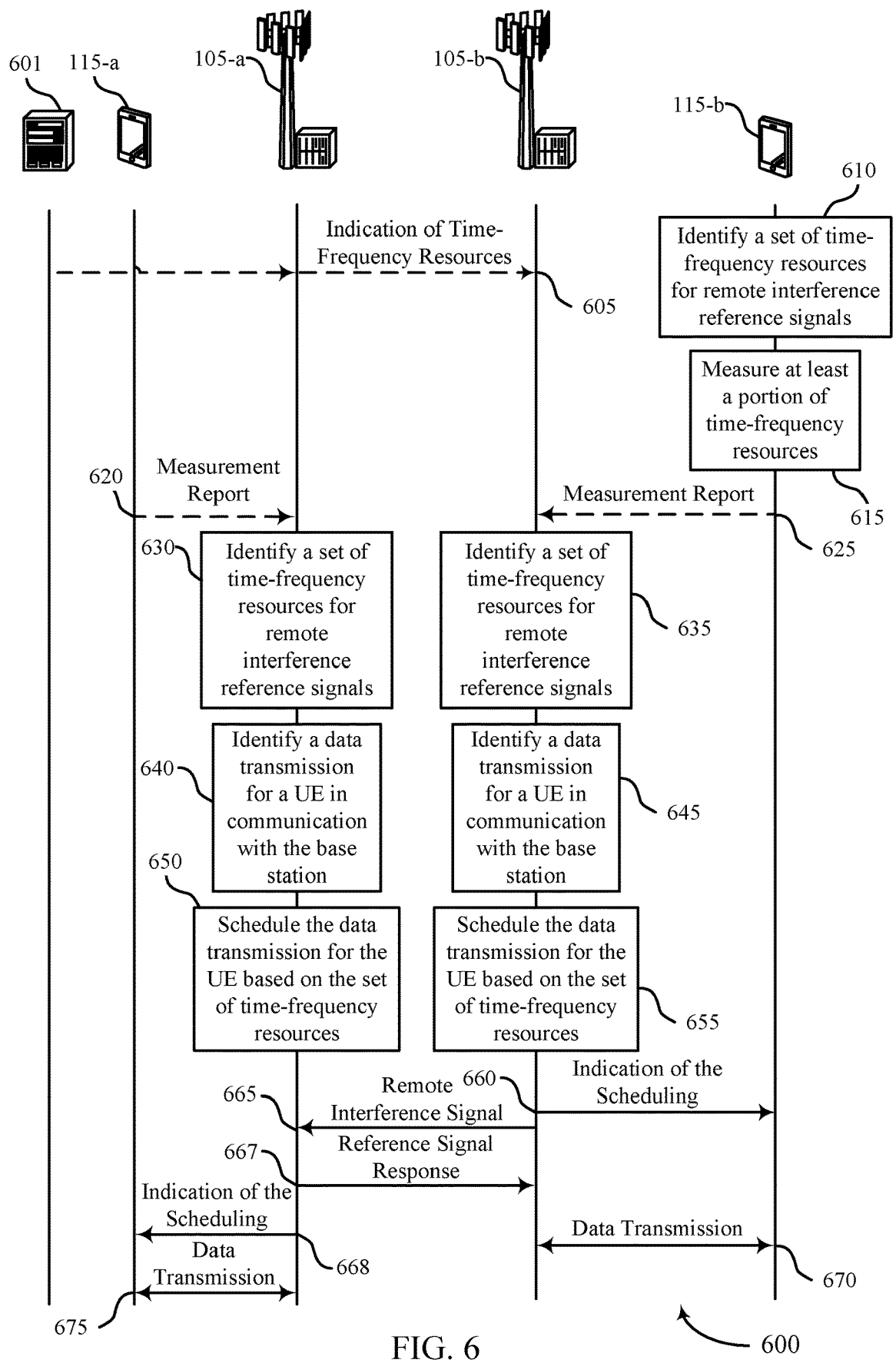
FIG. 6 illustrates an example of a process flow that supports interference mitigation for remote devices in accordance with various aspects of the present disclosure.

FIG. 6 illustrates an example of a process flow 600 that supports interference mitigation for remote devices in accordance with various aspects of the present disclosure. In some examples, process flow 600 may implement aspects of wireless communications system 100. As shown in FIG. 6, the process flow 600 includes a base station 105-*a* and a base station 105-*b*, which may each provide coverage to geographically distant cells (e.g., geographically separated by one hundred km or more). The process flow 600 also includes a controller 601 (i.e., a central controller), a UE 115-*a*, which may be one UE 115 of a set of UEs 115 that are in wireless communication with the base station 105-*a*, and a UE 115-*b*, which may be one UE 115 of a set of UEs 115 that are in wireless communication with the base station 105-*b*. Each device may be an example of a corresponding device described with reference to FIG. 1. The process flow 600 may illustrate examples of techniques for scheduling communications to mitigate remote interference between communications with the base station 105-*a* and communications with the base station 105-*b*. While the controller 601 is shown as a separate device, it should be understood that the functions of the controller 601 may in some cases be integrated into, for example, the base station 105-*a* or the base station 105-*b*.

At 605, the controller 601 may transmit to the base station 105-*a* and/or to the base station 105-*b*, and the base station 105-*a* and to the base station 105-*b* may receive from the controller 601, an indication of a set of time-frequency resources. In some cases, the set of time-frequency resources may span one or more frequency sub-bands (i.e., in the frequency domain) and/or one or more symbols (i.e., in the time domain).

At 610, the UE 115-*b* may identify the set of time-frequency resources for remote interference reference signals. In some cases, identifying the set of time-frequency resources for remote interference reference signals may include performing energy detection for a portion of the set of time-frequency resources configured for the UE 115-*b* and determining the set of time-frequency resources for remote interference reference signals based on the performed energy detection.

At 615, the UE 115-*b* may measure at least a portion of the set of time-frequency resources configured for the UE 115-*b* and/or a neighboring base station 105.

At 620, the UE 115-*a* may transmit to the base station 105-*a*, and the base station 105-*a* may receive from the UE 115-*a*, an indication of the set of time-frequency resources. In some cases, the indication of the set of time-frequency resources may be included in a measurement report.

At 625, the UE 115-*b* may transmit to the base station 105-*b*, and the base station 105-*b* may receive from the UE 115-*b*, a measurement report, as may have been measured at 615. In some cases, the measurement report may include the indication of the set of time-frequency resources, as may have been identified at 610.

At 630, the base station 105-*a* may identify the set of time-frequency resources for remote interference reference signals. In some cases, identifying the set of time-frequency resources for remote interference reference signals may include receiving signaling from one or more neighboring base stations 105. In some cases, identifying the set of time-frequency resources may include determining the set of time-frequency resources for remote interference reference signals based on the signaling received from the neighboring base stations 105.

In some cases, identifying the set of time-frequency resources may include performing energy detection for a portion of the set of time-frequency resources configured for the base station 105-*a* and determining the set of time-frequency resources for remote interference reference signals based on the performed energy detection.

In some cases, identifying the set of time-frequency resources may include, or be based on, for example, receiving the measurement report from the UE 115-*a* at 620 or from UE 115-*b* at 625, where the measurement report may indicate the set of time-frequency resources.

At 635, the base station 105-*b* may identify the set of time-frequency resources for remote interference reference signals. In some cases, identifying the set of time-frequency resources for remote interference reference signals may include and/or be based on receiving, from the controller 601 at 605, the indication of the set of time-frequency resources configured for remote interference reference signals, as may have been received at 605. In some cases, the set of time-frequency resources may span one or more frequency sub-bands (i.e., in the frequency domain) and/or one or more symbols (i.e., in the time domain).

In some cases, identifying the set of time-frequency resources for remote interference reference signals may include receiving signaling from one or more neighboring base stations 105. In some examples, identifying the set of time-frequency resources may include determining the set of time-frequency resources for remote interference reference signals based on the signaling received from the neighboring base stations 105. In some aspects, the signaling may be received via a backhaul communication link between the base station 105-*b* and one or more neighboring base stations 105.

At 640, the base station 105-*a* may identify a data transmission for a UE 115 in communication with the base station 105-*a*.

At 645, the base station 105-*b* may identify a data transmission for a UE 115 in communication with the base station 105-*b*.

At 650, the base station 105-*a* may schedule the data transmission for the UE 115 based on the set of time-frequency resources, as may have been identified at 630. In some cases, the base station 105-*a* may schedule the data transmission in resources non-overlapping with the set of time-frequency resources. In some cases, the set of time-frequency resources may be allocated to a group of base stations 105 including the base station 105-*a*.

At 655, the base station 105-*b* may schedule the data transmission for the UE 115 based on the set of time-frequency resources, as may have been identified at 635. In some cases, scheduling the data transmission at 655 may include scheduling the data transmission in the set of time-frequency resources around the set of time-frequency resources (e.g., rate matching around) as may have been identified at 635. In some cases, the set of time-frequency resources may be allocated to a group of base stations 105 including the base station 105-*b*.

At 660, the base station 105-*b* may transmit to the UE 115-*b*, and the UE 115-*b* may receive from the base station 105-*b*, an indication of the scheduling (or rate matching), as may have been scheduled at 655. In some cases, the base station 105-*b* may transmit the scheduling to the UE 115-*b* via RRC signaling or DCI.

At 665, the base station 105-*b* may transmit to the base station 105-*a*, and the base station 105-*a* may receive from the base station 105-*b*, a remote interference signal (i.e., the first reference signal, as described with reference to FIGS. 2 through 5), for example, via the set of time-frequency resources and the data transmission as may have been identified and scheduled at 630 through 655. In some cases, the base station 105-*a* may detect remote interference at the base station 105-*b* based on receiving the remote interference signal at 665, and the base station 105-*a* may back off one or more downlink transmissions to a UE 115 based on the detection of the remote interference.

At 667, the base station 105-*a* may transmit to the base station 105-*b*, and the base station 105-*b* may receive from the base station 105-*a*, a reference signal response (i.e., the second reference signal, as described with reference to FIGS. 2 through 5) in response to receiving the remote interference signal. The reference signal response may indicate the backed off downlink transmission. In some cases, the reference signal response may be based on a distance between the base station and the second base station.

At 668, the base station 105-*a* may transmit to the UE 115-*a*, and the UE 115-*a* may receive from the base station 105-*a*, an indication of the scheduling (or rate matching), as may have been scheduled at 650. In some cases, the base station 105-*a* may transmit the scheduling to the UE 115-*a* via RRC signaling or DCI.

At 670, the UE 115-*b* may communicate one or more data transmissions (e.g., uplink and/or downlink data transmissions) with the base station 105-*b*, for example, based on the set of time-frequency resources for remote interference reference signals, as may have been identified at 610 and/or 635. In some cases, the UE 115-*b* may communicate the data transmission with the base station 105-*b* by way of transmitting one or more uplink transmissions to the base station 105-*b* via resources that are non-overlapping with the set of time-frequency resources. In some cases, the set of time-frequency resources may be allocated to a group of base stations 105 including the base station 105-*b*.

At 675, the UE 115-*a* may communicate one or more data transmissions (e.g., uplink and/or downlink data transmissions) with the base station 105-*a*, for example, based on the set of time-frequency resources for remote interference reference signals, as may have been identified at 630. In some cases, the UE 115-*a* may communicate the data transmission with the base station 105-*a* by way of transmitting one or more uplink transmissions to the base station 105-*a* via resources that are non-overlapping with the set of time-frequency resources. In some cases, the set of time-frequency resources may be allocated to a group of base stations 105 including the base station 105-*a*.

Figure 7:
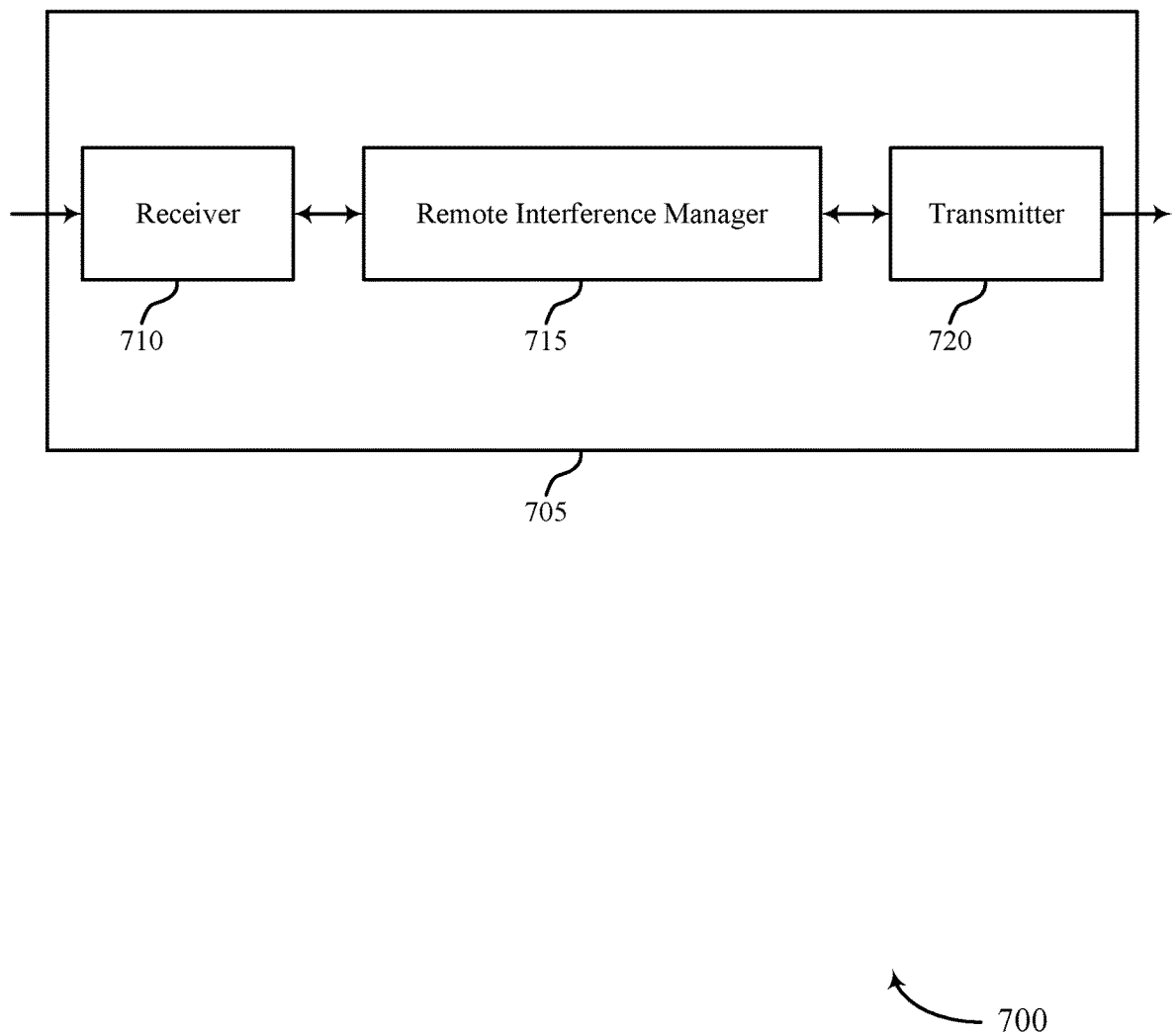
FIGS. 7 and 8 show block diagrams of devices that support interference mitigation for remote devices in accordance with various aspects of the present disclosure.

FIG. 7 shows a block diagram 700 of a device 705 that supports interference mitigation for remote devices in accordance with various aspects of the present disclosure. The device 705 may be an example of aspects of a UE as described herein. The device 705 may include a receiver 710, a remote interference manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to interference mitigation for remote devices, etc.). Information may be passed on to other components of the device 705. The receiver 710 may be an example of aspects of the transceiver 1020 described with reference to FIG. 10. The receiver 710 may utilize a single antenna or a set of antennas.

The remote interference manager 715 may identify a set of time-frequency resources for remote interference reference signals, transmit an indication of the set of time-frequency resources to a base station, and communicate a data transmission with the base station based on the set of time-frequency resources. The remote interference manager 715 may be an example of aspects of the remote interference manager 1010 described herein.

The remote interference manager 715, or its sub-components, may be implemented in hardware, code (e.g., software or firmware) executed by a processor, or any combination thereof. If implemented in code executed by a processor, the functions of the remote interference manager 715, or its sub-components may be executed by a general-purpose processor, a digital signal processor (DSP), an application-specific integrated circuit (ASIC), a field-programmable gate array (FPGA), or other programmable logic device, discrete gate or transistor logic, discrete hardware components, or any combination thereof designed to perform the functions described in the present disclosure.

The remote interference manager 715, or its sub-components, may be physically located at various positions, including being distributed such that portions of functions are implemented at different physical locations by one or more physical components. In some examples, the remote interference manager 715, or its sub-components, may be a separate and distinct component in accordance with various aspects of the present disclosure. In some examples, the remote interference manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

The actions performed by the remote interference manager 715 as described herein may be implemented to realize one or more potential advantages discussed herein. In one implementation, a UE may receive signaling from base station indicating a resource allocation such that communications between the UE and the base station do not interfere with communications with other nodes, for example, to and from another UE and base station. These techniques may relatively improve the reliability of communications between the UE and the base station. For example, reliability may be relatively improved due to a higher probability of transmissions being successfully communicated between the base station and the UE. Further, power may be conserved at the UE and the base station due to fewer retransmission (e.g., of transmission that would have otherwise not been correctly received due to interference). By implementing the interference mitigation techniques as described herein, a processor of a UE (e.g., controlling the receiver 710, the transmitter 720, or the transceiver 1020 as described with reference to FIG. 10) may more efficiently utilize power and spectral resources, for example, due to fewer retransmissions and/or reduced signaling overhead.

Figure 8:
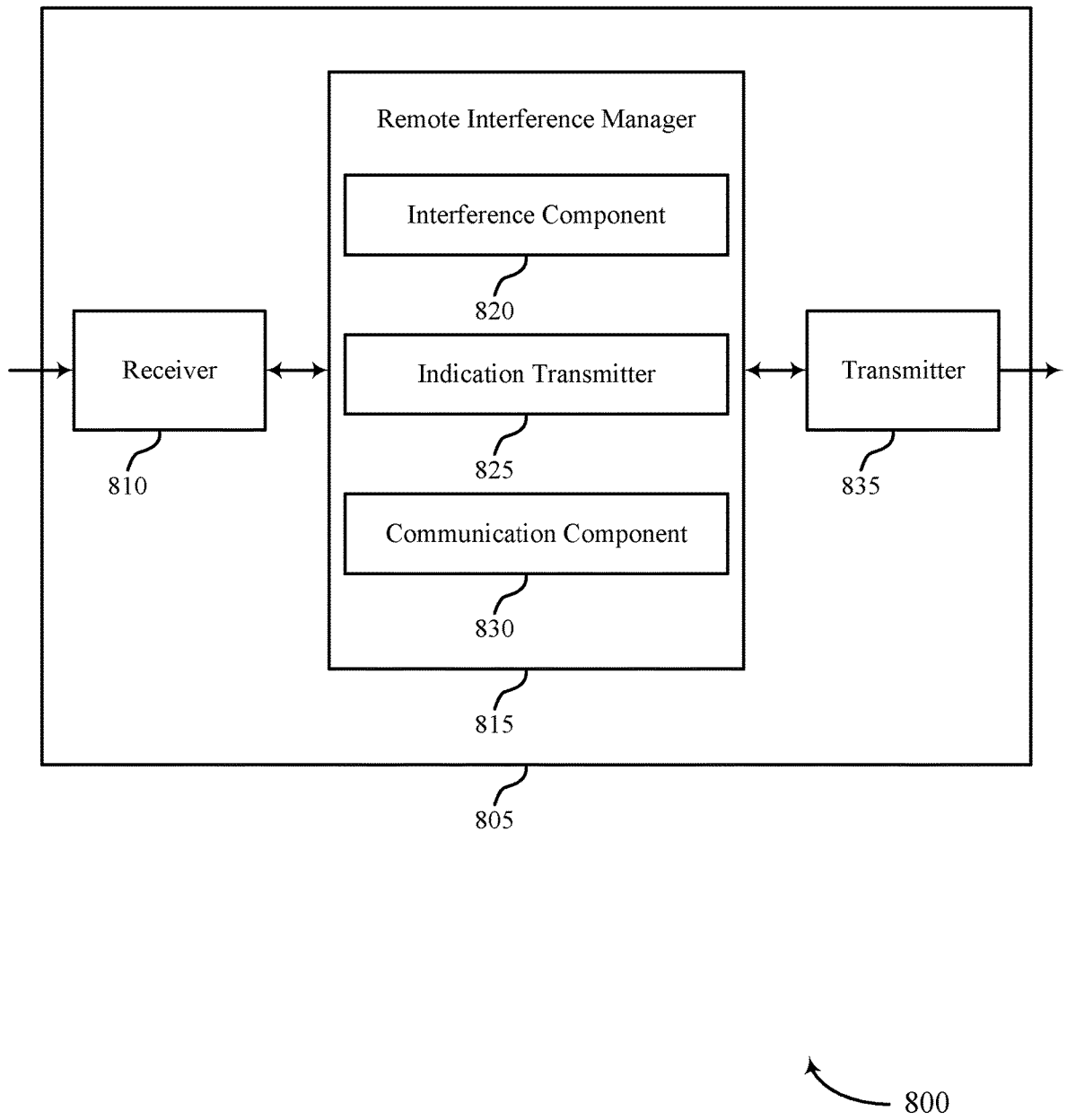

FIG. 8 shows a block diagram 800 of a device 805 that supports interference mitigation for remote devices in accordance with various aspects of the present disclosure. The device 805 may be an example of aspects of a device 705 or a UE as described herein. The device 805 may include a receiver 810, a remote interference manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to interference mitigation for remote devices, etc.). Information may be passed on to other components of the device 805. The receiver 810 may be an example of aspects of the transceiver 1020 described with reference to FIG. 10. The receiver 810 may utilize a single antenna or a set of antennas.

The remote interference manager 815 may be an example of aspects of the remote interference manager 715 as described herein. The remote interference manager 815 may include an interference component 820, an indication transmitter 825, and a communication component 830. The remote interference manager 815 may be an example of aspects of the remote interference manager 1010 described herein.

The interference component 820 may identify a set of time-frequency resources for remote interference reference signals.

The indication transmitter 825 may transmit an indication of the set of time-frequency resources to a base station. In some implementations, the actions performed by the indication transmitter 825, included in the remote interference manager 815, as described herein may facilitate the processor 1040, as described with reference to FIG. 10, to more efficiently cause the device 805 to perform various functions. For example, the device 805 may provide increased reliability for communications between a base station and a respective UE (e.g., the device 805). The increased communication reliability may provide performance improvements for the device 805, for example, by way of reducing a number of retransmissions used to communicate data that may not have been correctly received due to interference. This may conserve processing resources and correspondingly power consumption at the 805.

The communication component 830 may communicate a data transmission with the base station based on the set of time-frequency resources.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
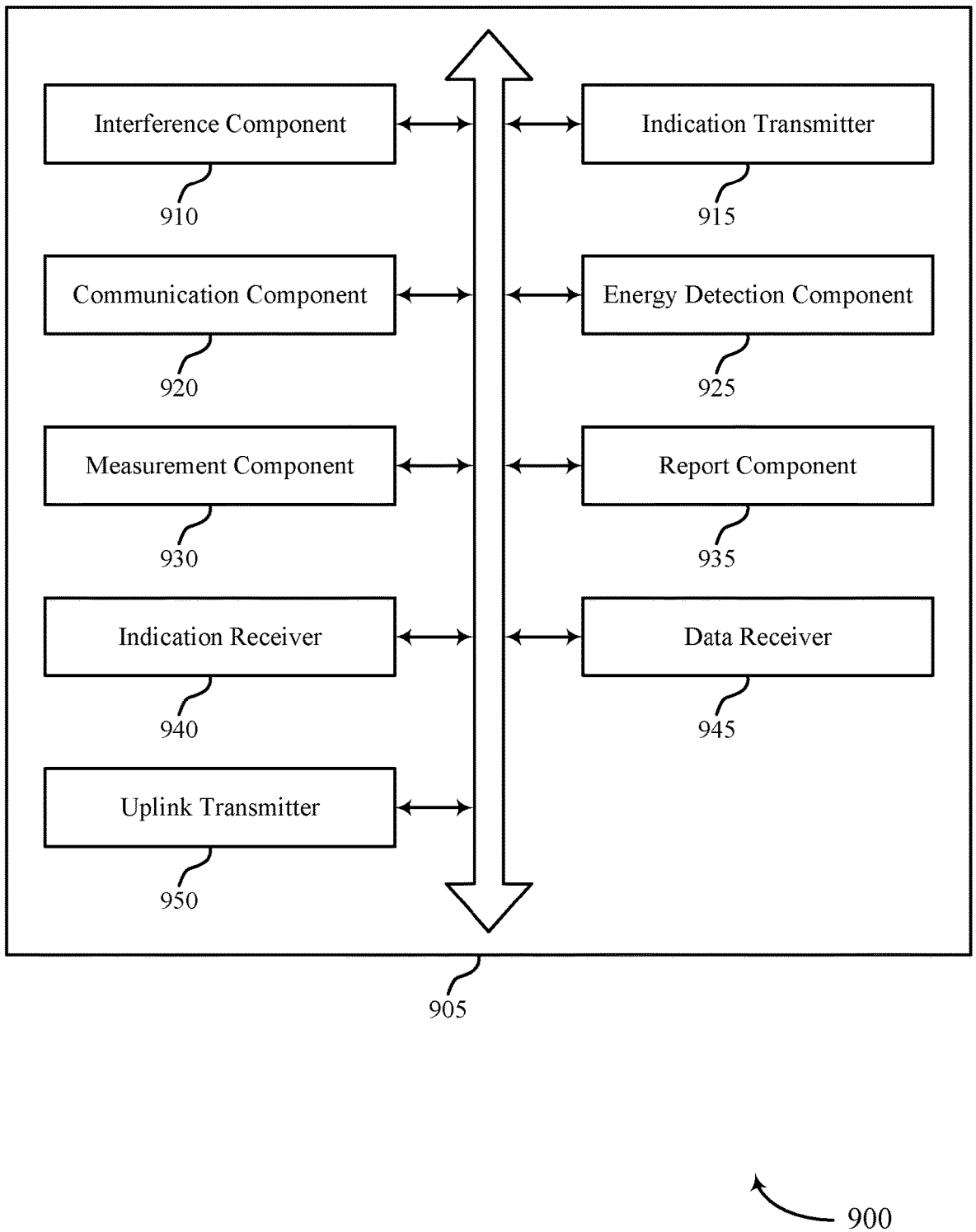
FIG. 9 shows a block diagram of a remote interference manager that supports interference mitigation for remote devices in accordance with various aspects of the present disclosure.

FIG. 9 shows a block diagram 900 of a remote interference manager 905 that supports interference mitigation for remote devices in accordance with various aspects of the present disclosure. The remote interference manager 905 may be an example of aspects of a remote interference manager 715, a remote interference manager 815, or a remote interference manager 1010 described herein. The remote interference manager 905 may include an interference component 910, an indication transmitter 915, a communication component 920, an energy detection component 925, a measurement component 930, a report component 935, an indication receiver 940, a data receiver 945, and an uplink transmitter 950. Each of these modules may communicate, directly or indirectly, with one another (e.g., via one or more buses).

The interference component 910 may identify a set of time-frequency resources for remote interference reference signals. In some examples, the interference component 910 may determine the set of time-frequency resources for remote interference reference signals based on the energy detection.

The indication transmitter 915 may transmit an indication of the set of time-frequency resources to a base station.

The communication component 920 may communicate a data transmission with the base station based on the set of time-frequency resources.

The energy detection component 925 may perform energy detection for a portion of the set of time-frequency resources configured for the UE.

The measurement component 930 may measure at least a portion of the set of time-frequency resources configured for the UE or a second base station.

The report component 935 may transmit a measurement report to the base station based on the measuring, where the measurement report includes the indication of the set of time-frequency resources.

The indication receiver 940 may receive, from the base station, an indication of scheduling of the data transmission via RRC signaling or DCI.

The data receiver 945 may receive the data transmission scheduled around the set of time-frequency resources.

The uplink transmitter 950 may transmit an uplink transmission to the base station via resources that are non-overlapping with the set of time-frequency resources.

Figure 10:
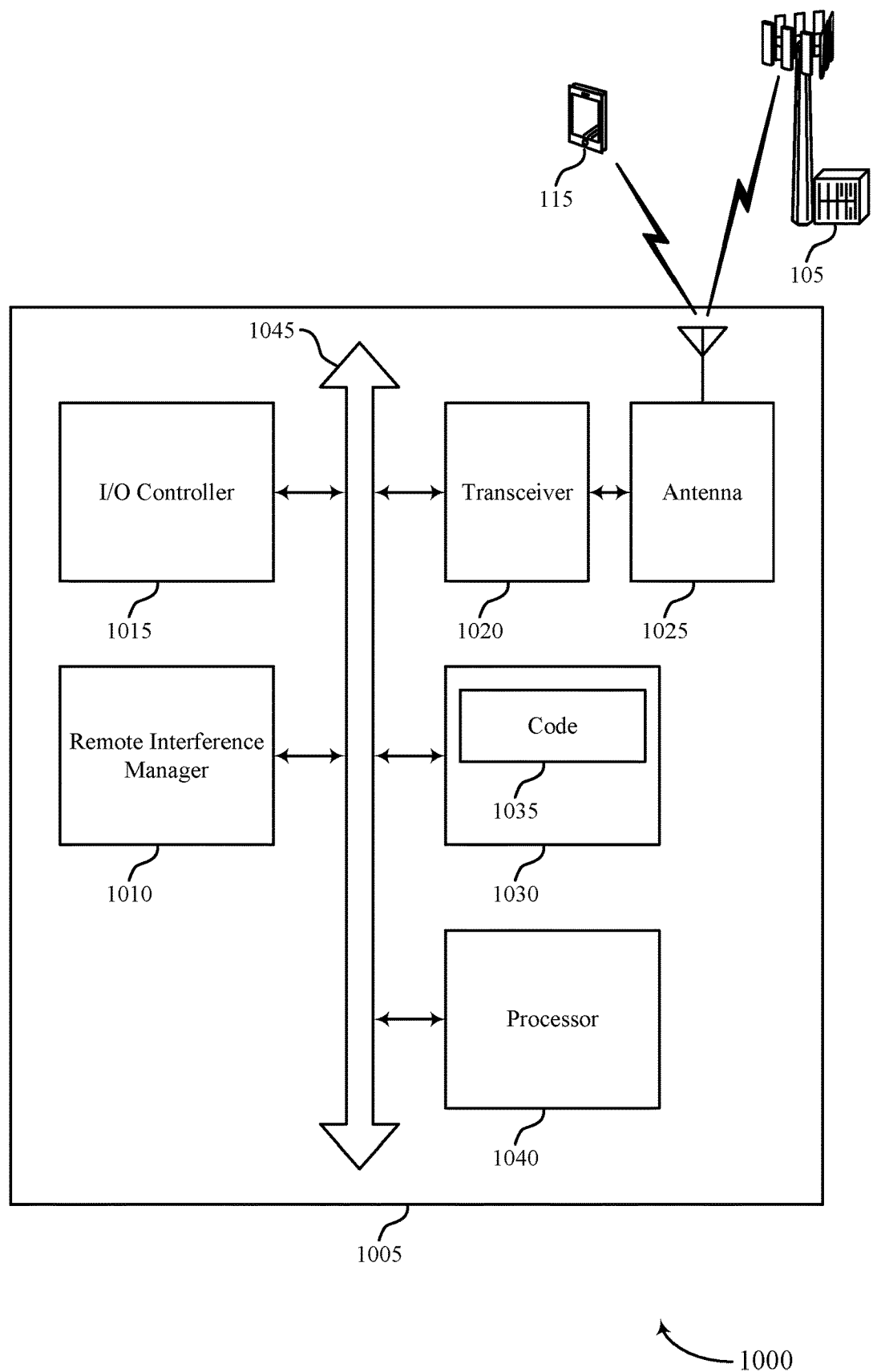
FIG. 10 shows a diagram of a system including a device that supports interference mitigation for remote devices in accordance with various aspects of the present disclosure.

FIG. 10 shows a diagram of a system 1000 including a device 1005 that supports interference mitigation for remote devices in accordance with various aspects of the present disclosure. The device 1005 may be an example of or include the components of device 705, device 805, or a UE as described herein. The device 1005 may include components for bi-directional voice and data communications including components for transmitting and receiving communications, including a remote interference manager 1010, an I/O controller 1015, a transceiver 1020, an antenna 1025, memory 1030, and a processor 1040. These components may be in electronic communication via one or more buses (e.g., bus 1045).

The remote interference manager 1010 may identify a set of time-frequency resources for remote interference reference signals, transmit an indication of the set of time-frequency resources to a base station, and communicate a data transmission with the base station based on the set of time-frequency resources.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

The device 1005 may include a single antenna 1025. In some cases, the device 1005 may have more than one antenna 1025, which may be capable of concurrently transmitting or receiving multiple wireless transmissions.

The memory 1030 may include random access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic input/output system (BIOS) which may control basic hardware or software operation such as the interaction with peripheral components or devices.

The processor 1040 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting interference mitigation for remote devices).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
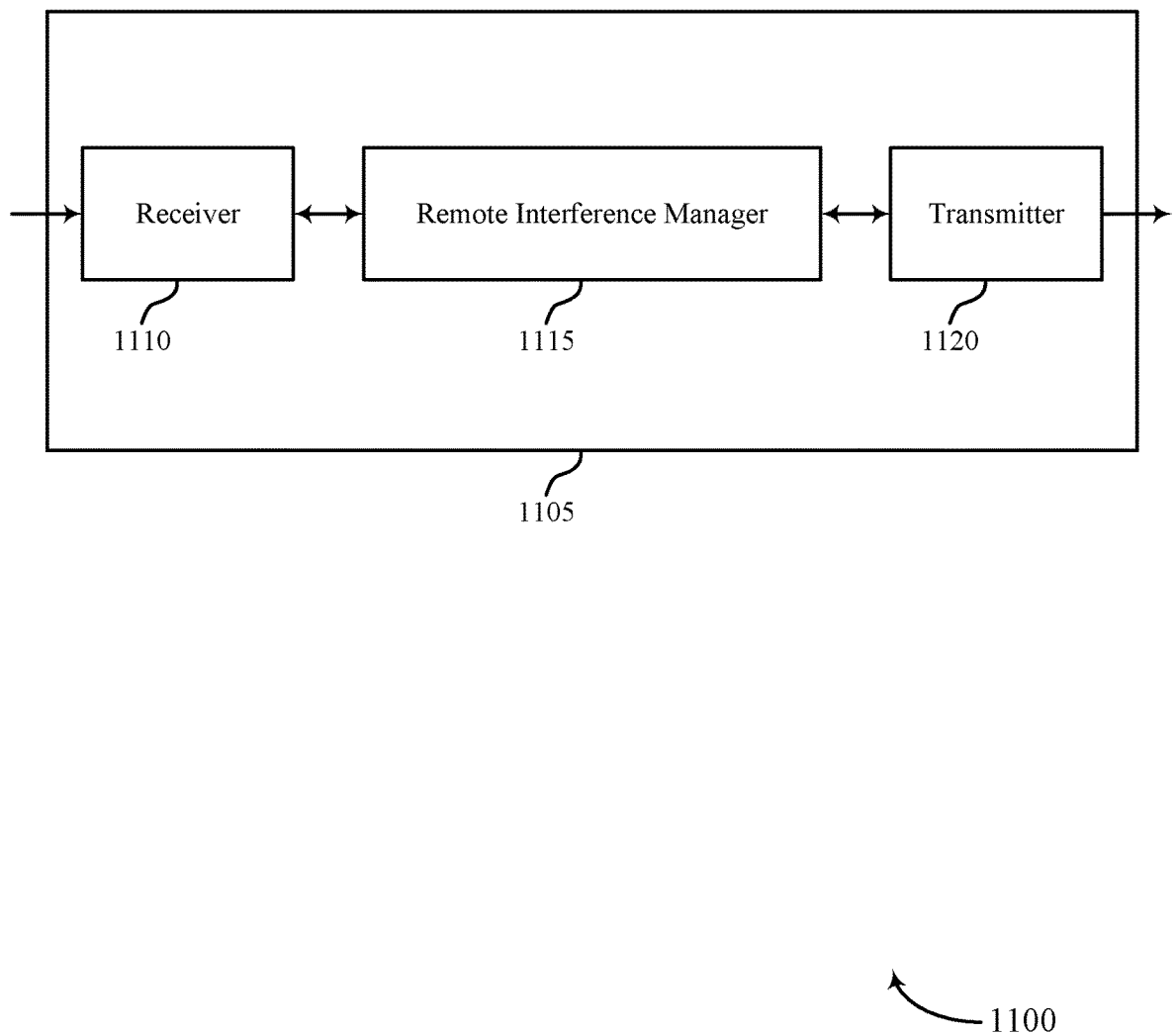
FIGS. 11 and 12 show block diagrams of devices that support interference mitigation for remote devices in accordance with various aspects of the present disclosure.

FIG. 11 shows a block diagram 1100 of a device 1105 that supports interference mitigation for remote devices in accordance with various aspects of the present disclosure. The device 1105 may be an example of aspects of a base station as described herein. The device 1105 may include a receiver 1110, a remote interference manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to interference mitigation for remote devices, etc.). Information may be passed on to other components of the device 1105. The receiver 1110 may be an example of aspects of the transceiver 1420 described with reference to FIG. 14. The receiver 1110 may utilize a single antenna or a set of antennas.

The remote interference manager 1115 may identify a set of time-frequency resources for remote interference reference signals, identify a data transmission for a UE in communication with the base station, schedule the data transmission for the UE based on the set of time-frequency resources, and transmit a remote interference signal via the set of time-frequency resources and the data transmission.

The remote interference manager 1115 may also identify a set of time-frequency resources for remote interference reference signals, identify a data transmission for a UE in communication with the base station, schedule the data transmission for the UE based on the set of time-frequency resources, and receive a remote interference signal via the set of time-frequency resources and the data transmission.

The remote interference manager 1115 may be an example of aspects of the remote interference manager 1410 described herein.

The remote interference manager 1115, or its sub-components, may be implemented in hardware, code (e.g., software or firmware) executed by a processor, or any combination thereof. If implemented in code executed by a processor, the functions of the remote interference manager 1115, or its sub-components may be executed by a general-purpose processor, a DSP, an ASIC, an FPGA, or other programmable logic device, discrete gate or transistor logic, discrete hardware components, or any combination thereof designed to perform the functions described in the present disclosure.

The remote interference manager 1115, or its sub-components, may be physically located at various positions, including being distributed such that portions of functions are implemented at different physical locations by one or more physical components. In some examples, the remote interference manager 1115, or its sub-components, may be a separate and distinct component in accordance with various aspects of the present disclosure. In some examples, the remote interference manager 1115, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

The actions performed by the remote interference manager 1115 as described herein may be implemented to realize one or more potential advantages discussed herein. In one implementation, a base station may transmit signaling to UEs in the coverage area of the base station indicating a resource allocation such that communications between the UEs and the base station do not interfere with communications with other nodes, for example, to and from another base station its respective UEs. These techniques may relatively improve the reliability of communications between the base station and served UEs. For example, reliability may be relatively improved due to a higher probability of transmissions being successfully communicated between the base station and the UE. Further, power may be conserved at the UE and the base station due to fewer retransmission (e.g., of transmission that would have otherwise not been correctly received due to interference). By implementing the interference mitigation techniques as described herein, a processor of a base station (e.g., controlling the receiver 1110, the transmitter 1120, or the transceiver 1420 as described with reference to FIG. 14) may more efficiently utilize power and spectral resources, for example, due to fewer retransmissions and/or reduced signaling overhead.

Figure 12:
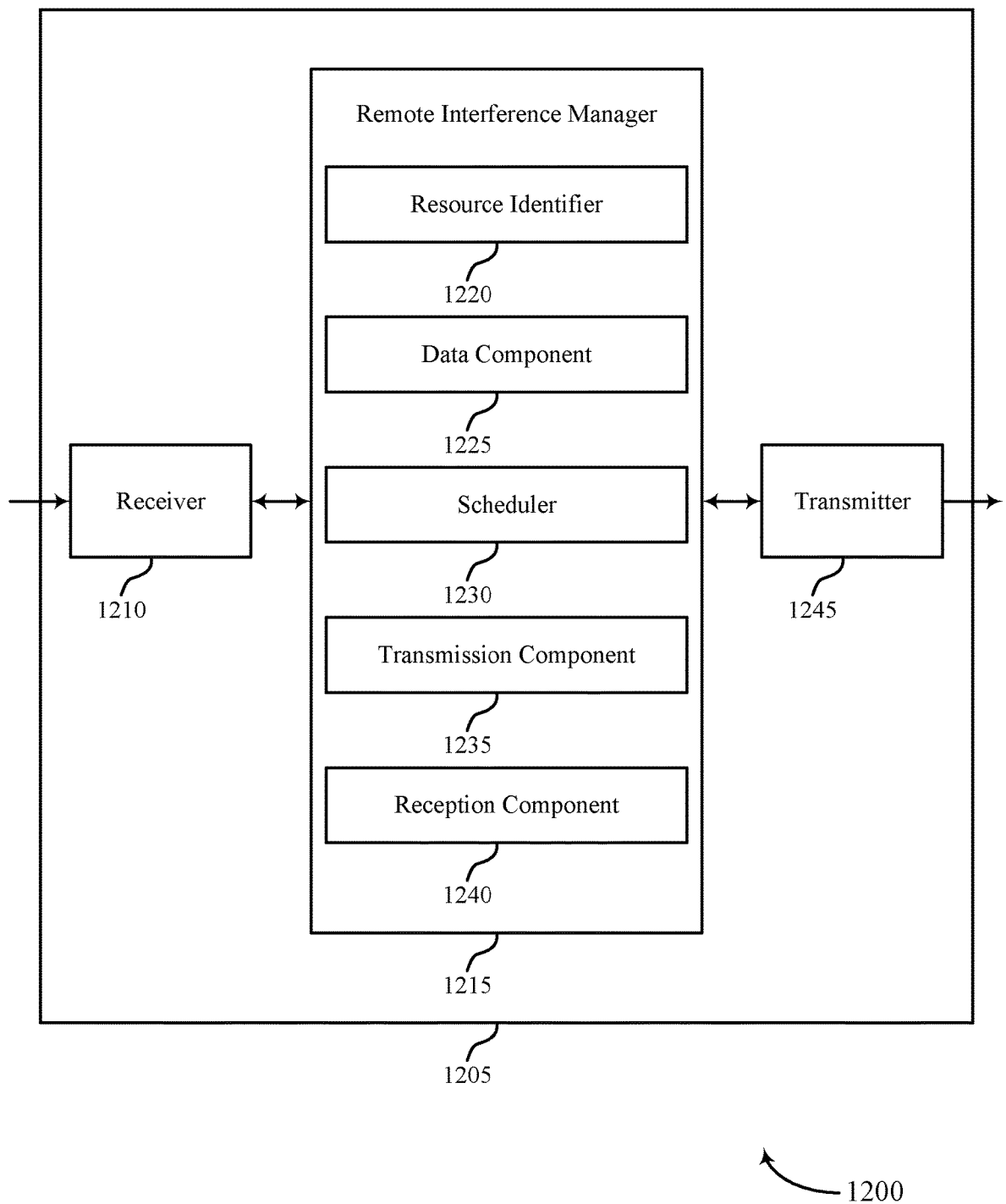

FIG. 12 shows a block diagram 1200 of a device 1205 that supports interference mitigation for remote devices in accordance with various aspects of the present disclosure. The device 1205 may be an example of aspects of a device 1105 or a base station as described herein. The device 1205 may include a receiver 1210, a remote interference manager 1215, and a transmitter 1245. The device 1205 may also include a processor. Each of these components may be in communication with one another (e.g., via one or more buses).

The receiver 1210 may receive information such as packets, user data, or control information associated with various information channels (e.g., control channels, data channels, and information related to interference mitigation for remote devices, etc.). Information may be passed on to other components of the device 1205. The receiver 1210 may be an example of aspects of the transceiver 1420 described with reference to FIG. 14. The receiver 1210 may utilize a single antenna or a set of antennas.

The remote interference manager 1215 may be an example of aspects of the remote interference manager 1115 as described herein. The remote interference manager 1215 may include a resource identifier 1220, a data component 1225, a scheduler 1230, a transmission component 1235, and a reception component 1240. The remote interference manager 1215 may be an example of aspects of the remote interference manager 1410 described herein.

The resource identifier 1220 may identify a set of time-frequency resources for remote interference reference signals.

The data component 1225 may identify a data transmission for a UE in communication with the base station.

The scheduler 1230 may schedule the data transmission for the UE based on the set of time-frequency resources. In some implementations, the actions performed by the scheduler 1230, included in the remote interference manager 1205, as described herein may facilitate the processor 1440, as described with reference to FIG. 14, to more efficiently cause the device 1205 to perform various functions. For example, the device 1205 may provide increased reliability for communications between a base station (e.g., the device 1205) and its respective served UEs. The increased communication reliability may provide performance improvements for the device 1205, for example, by way of reducing a number of retransmissions used to communicate data that may not have been correctly received due to interference. This may conserve processing resources and correspondingly power consumption at the 1205.

The transmission component 1235 may transmit a remote interference signal via the set of time-frequency resources and the data transmission. The transmission component 1235 may transmit a reference signal response in response to receiving the remote interference signal, the reference signal response indicating a backed off downlink transmission. In some cases, the reference signal response may be based on a distance between the base station and the second base station.

The reception component 1240 may receive a remote interference signal via the set of time-frequency resources and the data transmission. The reception component 1240 may receive a reference signal response in response to the transmitted remote interference signal, the reference signal response indicating one or more backed off downlink transmissions. In some cases, the reference signal response may be based on a distance between the base station and the second base station.

The transmitter 1245 may transmit signals generated by other components of the device 1205. In some examples, the transmitter 1245 may be collocated with a receiver 1210 in a transceiver module. For example, the transmitter 1245 may be an example of aspects of the transceiver 1420 described with reference to FIG. 14. The transmitter 1245 may utilize a single antenna or a set of antennas.

Figure 13:
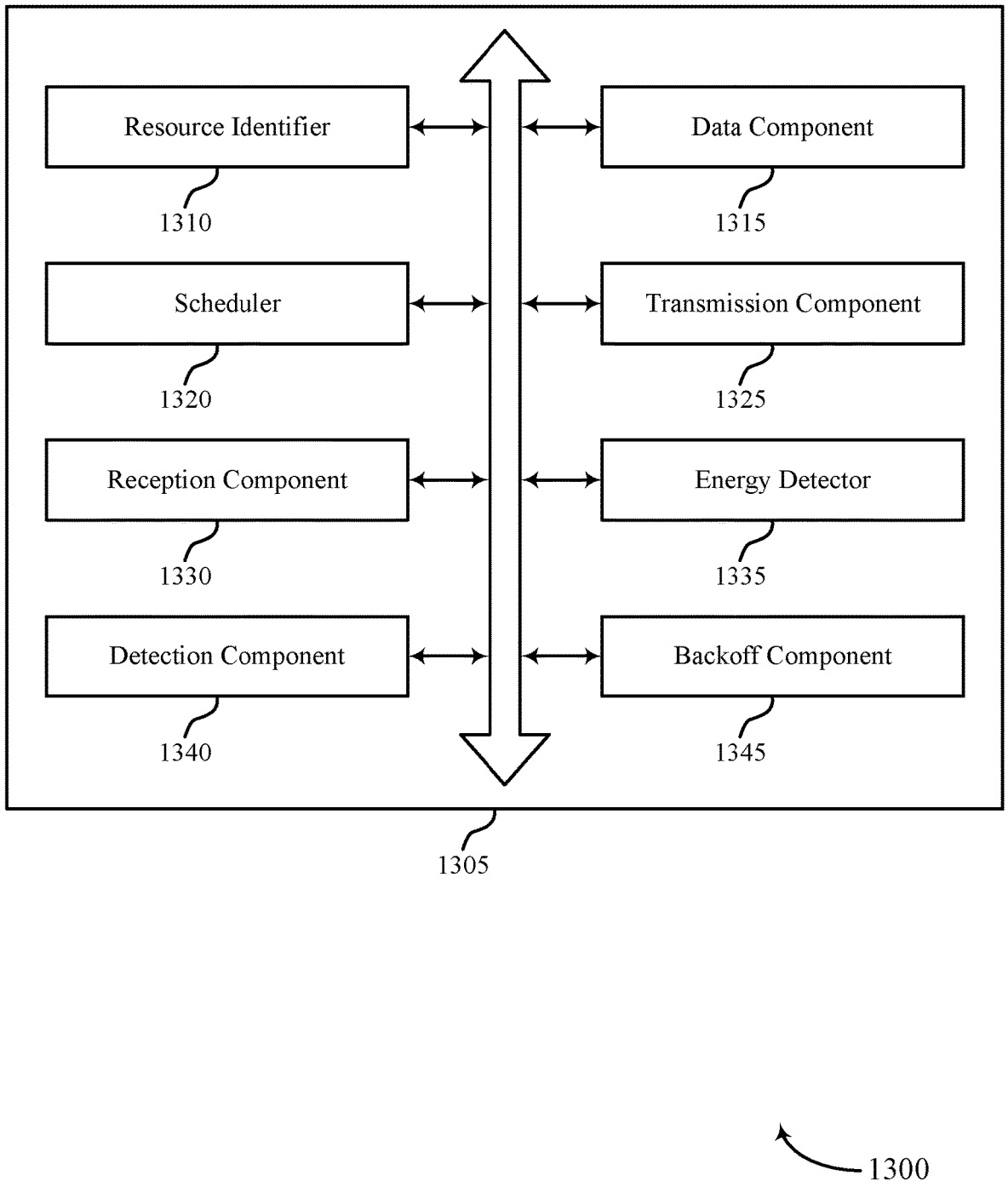
FIG. 13 shows a block diagram of a remote interference manager that supports interference mitigation for remote devices in accordance with various aspects of the present disclosure.

FIG. 13 shows a block diagram 1300 of a remote interference manager 1305 that supports interference mitigation for remote devices in accordance with various aspects of the present disclosure. The remote interference manager 1305 may be an example of aspects of a remote interference manager 1115, a remote interference manager 1215, or a remote interference manager 1410 described herein. The remote interference manager 1305 may include a resource identifier 1310, a data component 1315, a scheduler 1320, a transmission component 1325, a reception component 1330, an energy detector 1335, a detection component 1340, and a backoff component 1345. Each of these modules may communicate, directly or indirectly, with one another (e.g., via one or more buses).

The resource identifier 1310 may identify a set of time-frequency resources for remote interference reference signals. In some examples, the resource identifier 1310 may determine the set of time-frequency resources for remote interference reference signals based on the signaling. In some aspects, the resource identifier 1310 may determine the set of time-frequency resources for remote interference reference signals based on the energy detection. In some cases, the set of time-frequency resources is allocated to a group of base stations including the base station.

The data component 1315 may identify a data transmission for a UE in communication with the base station.

The scheduler 1320 may schedule the data transmission for the UE based on the set of time-frequency resources. In some examples, the scheduler 1320 may schedule the data transmission in resources around the set of time-frequency resources. In some cases, the scheduler 1320 may schedule the data transmission in resources non-overlapping with the set of time-frequency resources.

The transmission component 1325 may transmit a remote interference signal via the set of time-frequency resources and the data transmission. In some examples, the transmission component 1325 may transmit, to the UE, an indication of the scheduling via RRC signaling or DCI. In some cases, the transmission component 1325 may transmit the remote interference signal based on detection of the remote interference from the second base station. The transmission component 1325 may transmit a reference signal response in response to receiving the remote interference signal, the reference signal response indicating a backed off downlink transmission. In some cases, the reference signal response may be based on a distance between the base station and the second base station.

The reception component 1330 may receive a remote interference signal via the set of time-frequency resources and the data transmission. In some examples, the reception component 1330 may receive, from a central controller, an indication of the set of time-frequency resources configured for remote interference reference signals. In some cases, the reception component 1330 may receive signaling from a second base station. In some aspects, the reception component 1330 may receive, from the UE, a measurement report that indicates the set of time-frequency resources. In some instances, the set of time-frequency resources may span one or more frequency sub-bands and one or more symbols. In some cases, the signaling is received via a backhaul communication link between the base station and the second base station. In some cases, the set of time-frequency resources may span one or more frequency sub-bands and one or more symbols. The reception component 1330 may receive a reference signal response in response to the transmitted remote interference signal, the reference signal response indicating one or more backed off downlink transmissions. In some cases, the reference signal response may be based on a distance between the base station and the second base station.

The energy detector 1335 may perform energy detection for a portion of the set of time-frequency resources configured for the base station.

The detection component 1340 may detect, at the base station, remote interference from a second base station. In some examples, the detection component 1340 may detect an interference over thermal noise level of a signal from the second base station, the interference over thermal noise level associated with an interference level greater than an interference threshold. In some cases, the detection component 1340 may detect, at the base station, remote interference at a second base station based on receiving the remote interference signal.

The backoff component 1345 may back off a downlink transmission to the UE based on the detection of the remote interference.

Figure 14:
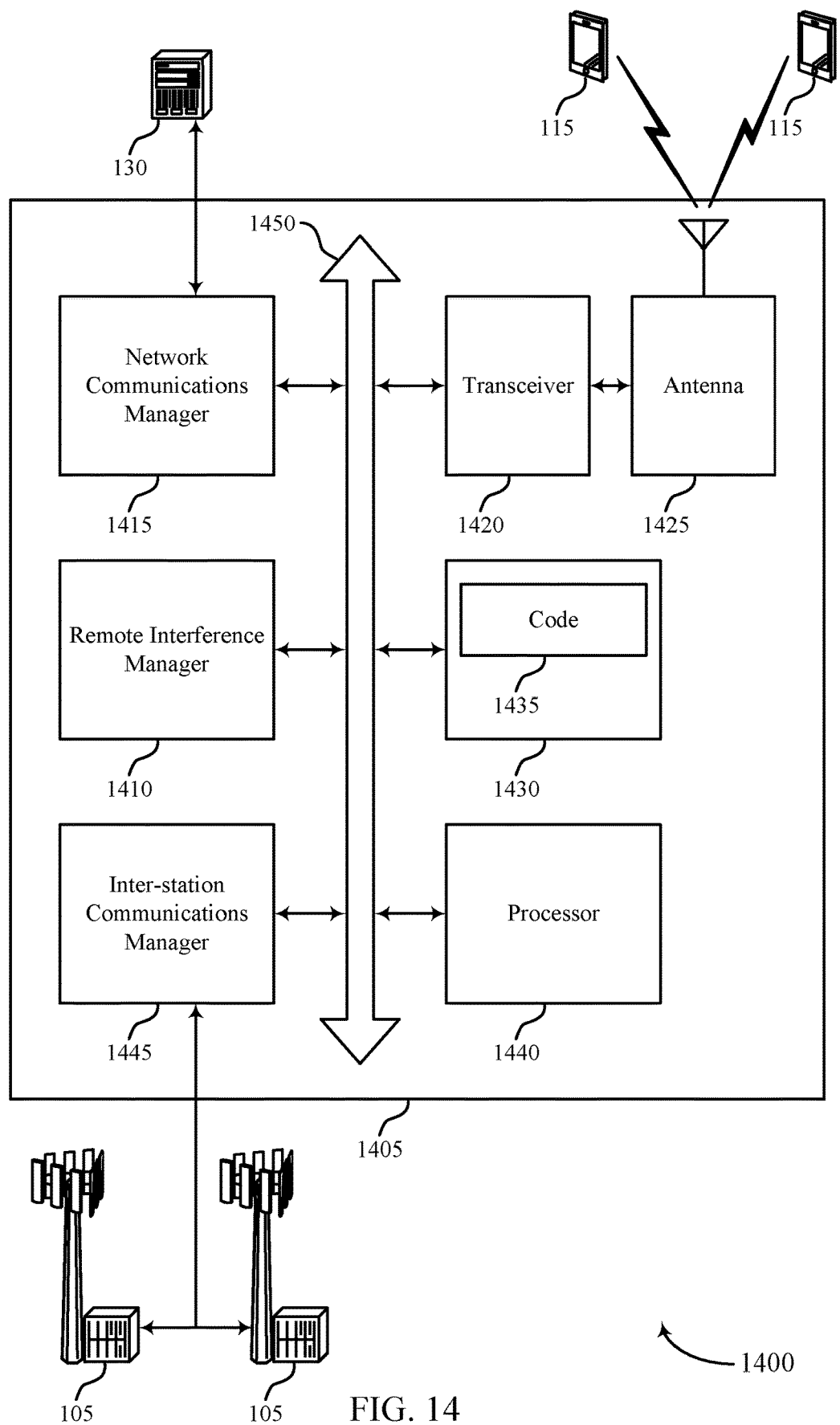
FIG. 14 shows a diagram of a system including a device that supports interference mitigation for remote devices in accordance with various aspects of the present disclosure.

FIG. 14 shows a diagram of a system 1400 including a device 1405 that supports interference mitigation for remote devices in accordance with various aspects of the present disclosure. The device 1405 may be an example of or include the components of device 1105, device 1205, or a base station as described herein. The device 1405 may include components for bi-directional voice and data communications including components for transmitting and receiving communications, including a remote interference manager 1410, a network communications manager 1415, a transceiver 1420, an antenna 1425, memory 1430, a processor 1440, and an inter-station communications manager 1445. These components may be in electronic communication via one or more buses (e.g., bus 1450).

The remote interference manager 1410 may identify a set of time-frequency resources for remote interference reference signals, identify a data transmission for a UE in communication with the base station, schedule the data transmission for the UE based on the set of time-frequency resources, and transmit a remote interference signal via the set of time-frequency resources and the data transmission.

The remote interference manager 1410 may also identify a set of time-frequency resources for remote interference reference signals, identify a data transmission for a UE in communication with the base station, schedule the data transmission for the UE based on the set of time-frequency resources, and receive a remote interference signal via the set of time-frequency resources and the data transmission.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described herein. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the device 1405 may include a single antenna 1425. However, in some cases, the device 1405 may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting interference mitigation for remote devices).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
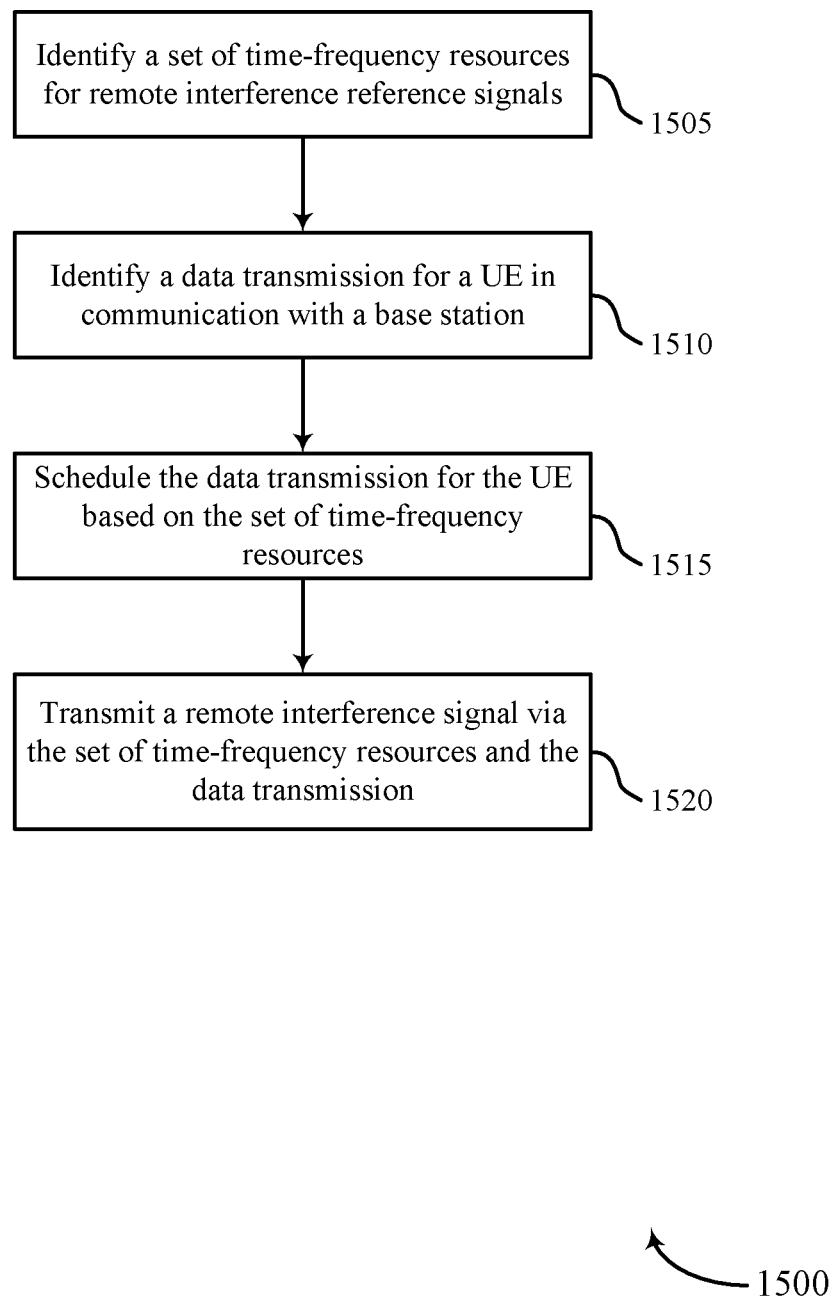
FIGS. 15 through 25 show flowcharts illustrating methods that support interference mitigation for remote devices in accordance with various aspects of the present disclosure.

FIG. 15 shows a flowchart illustrating a method 1500 that supports interference mitigation for remote devices in accordance with various aspects of the present disclosure. The operations of method 1500 may be implemented by a base station or its components as described herein. For example, the operations of method 1500 may be performed by a remote interference manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 1505, the base station may identify a set of time-frequency resources for remote interference reference signals. The operations of 1505 may be performed according to the methods described herein. In some examples, aspects of the operations of 1505 may be performed by a resource identifier as described with reference to FIGS. 11 through 14.

At 1510, the base station may identify a data transmission for a UE in communication with the base station. The operations of 1510 may be performed according to the methods described herein. In some examples, aspects of the operations of 1510 may be performed by a data component as described with reference to FIGS. 11 through 14.

At 1515, the base station may schedule the data transmission for the UE based on the set of time-frequency resources. The operations of 1515 may be performed according to the methods described herein. In some examples, aspects of the operations of 1515 may be performed by a scheduler as described with reference to FIGS. 11 through 14.

At 1520, the base station may transmit a remote interference signal via the set of time-frequency resources and the data transmission. The operations of 1520 may be performed according to the methods described herein. In some examples, aspects of the operations of 1520 may be performed by a transmission component as described with reference to FIGS. 11 through 14.

Figure 16:
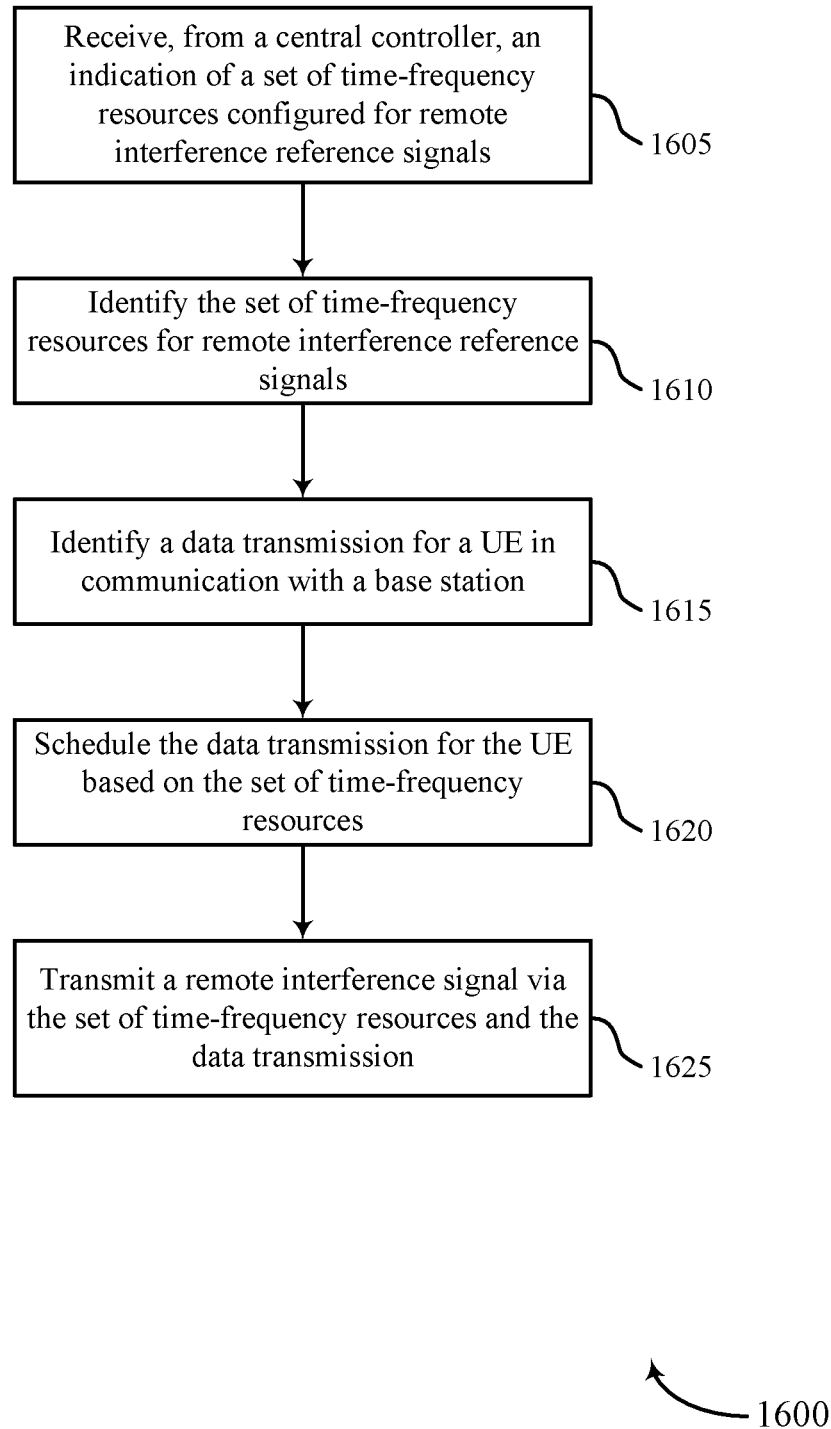

FIG. 16 shows a flowchart illustrating a method 1600 that supports interference mitigation for remote devices in accordance with various aspects of the present disclosure. The operations of method 1600 may be implemented by a base station or its components as described herein. For example, the operations of method 1600 may be performed by a remote interference manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 1605, the base station may receive, from a central controller, an indication of a set of time-frequency resources configured for remote interference reference signals. The operations of 1605 may be performed according to the methods described herein. In some examples, aspects of the operations of 1605 may be performed by a reception component as described with reference to FIGS. 11 through 14.

At 1610, the base station may identify the set of time-frequency resources for remote interference reference signals (e.g., based on the indication received at 1605). The operations of 1610 may be performed according to the methods described herein. In some examples, aspects of the operations of 1610 may be performed by a resource identifier as described with reference to FIGS. 11 through 14.

At 1615, the base station may identify a data transmission for a UE in communication with the base station. The operations of 1615 may be performed according to the methods described herein. In some examples, aspects of the operations of 1615 may be performed by a data component as described with reference to FIGS. 11 through 14.

At 1620, the base station may schedule the data transmission for the UE based on the set of time-frequency resources. The operations of 1620 may be performed according to the methods described herein. In some examples, aspects of the operations of 1620 may be performed by a scheduler as described with reference to FIGS. 11 through 14.

At 1625, the base station may transmit a remote interference signal via the set of time-frequency resources and the data transmission. The operations of 1625 may be performed according to the methods described herein. In some examples, aspects of the operations of 1625 may be performed by a transmission component as described with reference to FIGS. 11 through 14.

Figure 17:
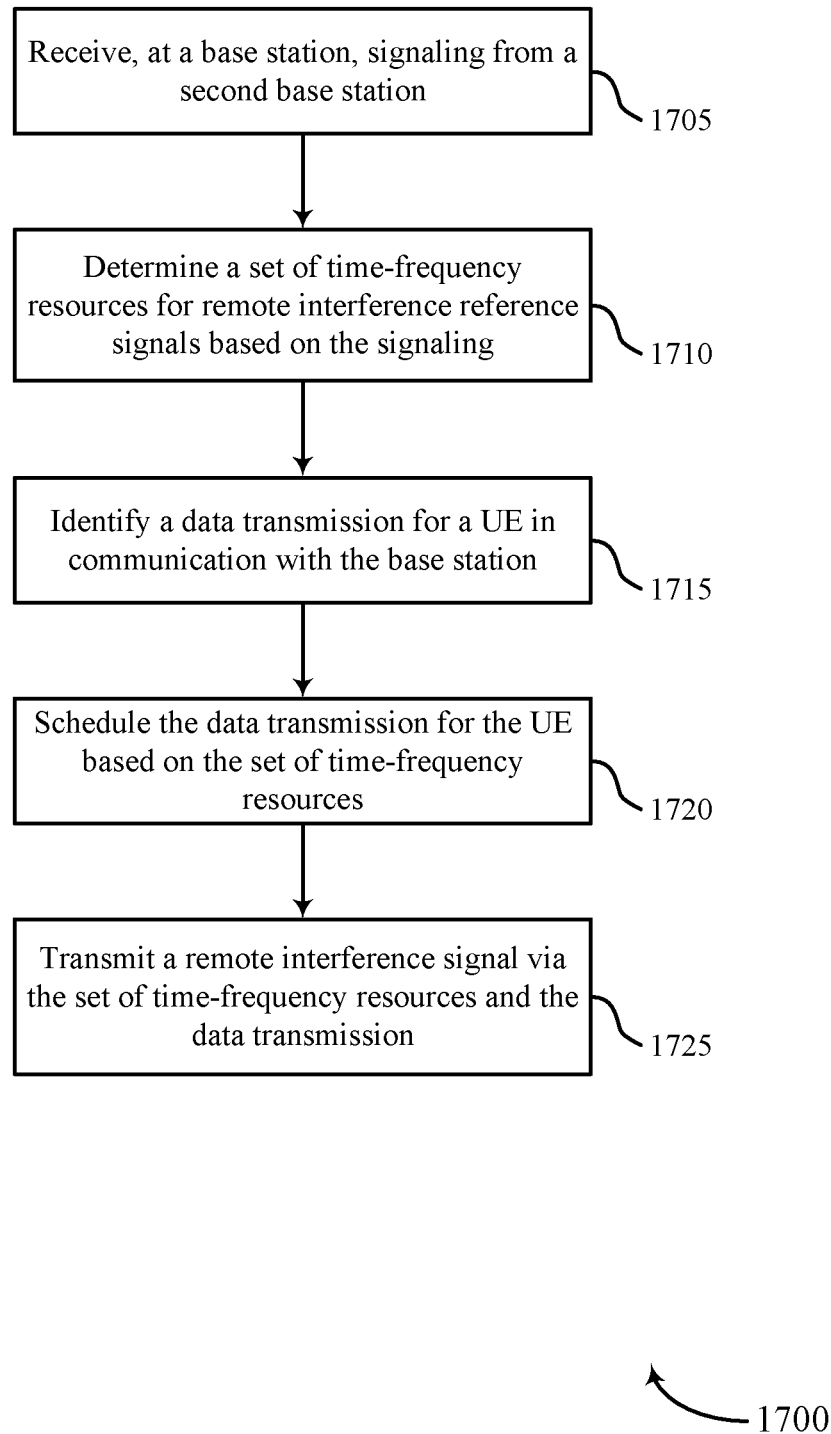

FIG. 17 shows a flowchart illustrating a method 1700 that supports interference mitigation for remote devices in accordance with various aspects of the present disclosure. The operations of method 1700 may be implemented by a base station or its components as described herein. For example, the operations of method 1700 may be performed by a remote interference manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 1705, the base station may receive signaling from a second base station. The operations of 1705 may be performed according to the methods described herein. In some examples, aspects of the operations of 1705 may be performed by a reception component as described with reference to FIGS. 11 through 14.

At 1710, the base station may determine a set of time-frequency resources for remote interference reference signals based on the signaling. The operations of 1710 may be performed according to the methods described herein. In some examples, aspects of the operations of 1710 may be performed by a resource identifier as described with reference to FIGS. 11 through 14.

At 1715, the base station may identify a data transmission for a UE in communication with the base station. The operations of 1715 may be performed according to the methods described herein. In some examples, aspects of the operations of 1715 may be performed by a data component as described with reference to FIGS. 11 through 14.

At 1720, the base station may schedule the data transmission for the UE based on the set of time-frequency resources. The operations of 1720 may be performed according to the methods described herein. In some examples, aspects of the operations of 1720 may be performed by a scheduler as described with reference to FIGS. 11 through 14.

At 1725, the base station may transmit a remote interference signal via the set of time-frequency resources and the data transmission. The operations of 1725 may be performed according to the methods described herein. In some examples, aspects of the operations of 1725 may be performed by a transmission component as described with reference to FIGS. 11 through 14.

Figure 18:
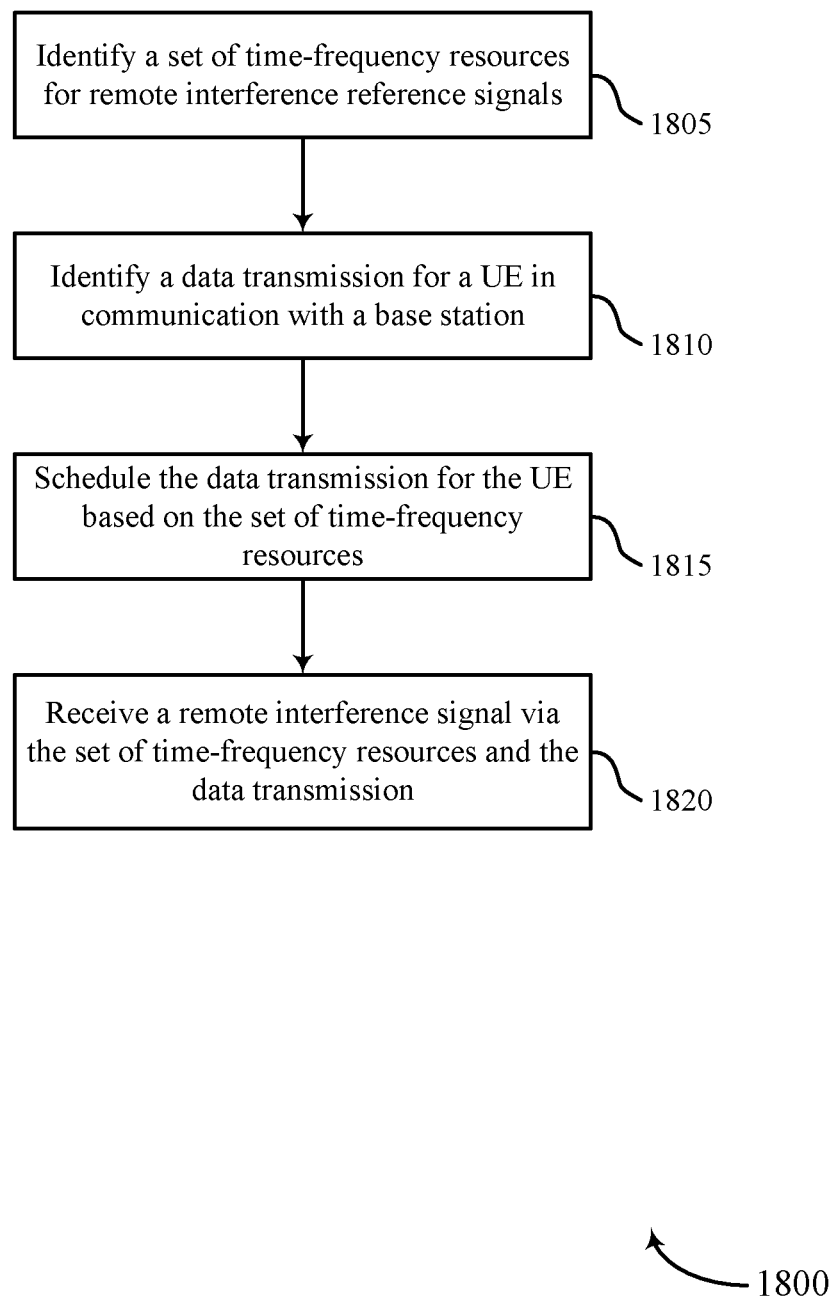

FIG. 18 shows a flowchart illustrating a method 1800 that supports interference mitigation for remote devices in accordance with various aspects of the present disclosure. The operations of method 1800 may be implemented by a base station or its components as described herein. For example, the operations of method 1800 may be performed by a remote interference manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 1805, the base station may identify a set of time-frequency resources for remote interference reference signals. The operations of 1805 may be performed according to the methods described herein. In some examples, aspects of the operations of 1805 may be performed by a resource identifier as described with reference to FIGS. 11 through 14.

At 1810, the base station may identify a data transmission for a UE in communication with the base station. The operations of 1810 may be performed according to the methods described herein. In some examples, aspects of the operations of 1810 may be performed by a data component as described with reference to FIGS. 11 through 14.

At 1815, the base station may schedule the data transmission for the UE based on the set of time-frequency resources. The operations of 1815 may be performed according to the methods described herein. In some examples, aspects of the operations of 1815 may be performed by a scheduler as described with reference to FIGS. 11 through 14.

At 1820, the base station may receive a remote interference signal via the set of time-frequency resources and the data transmission. The operations of 1820 may be performed according to the methods described herein. In some examples, aspects of the operations of 1820 may be performed by a reception component as described with reference to FIGS. 11 through 14.

Figure 19:
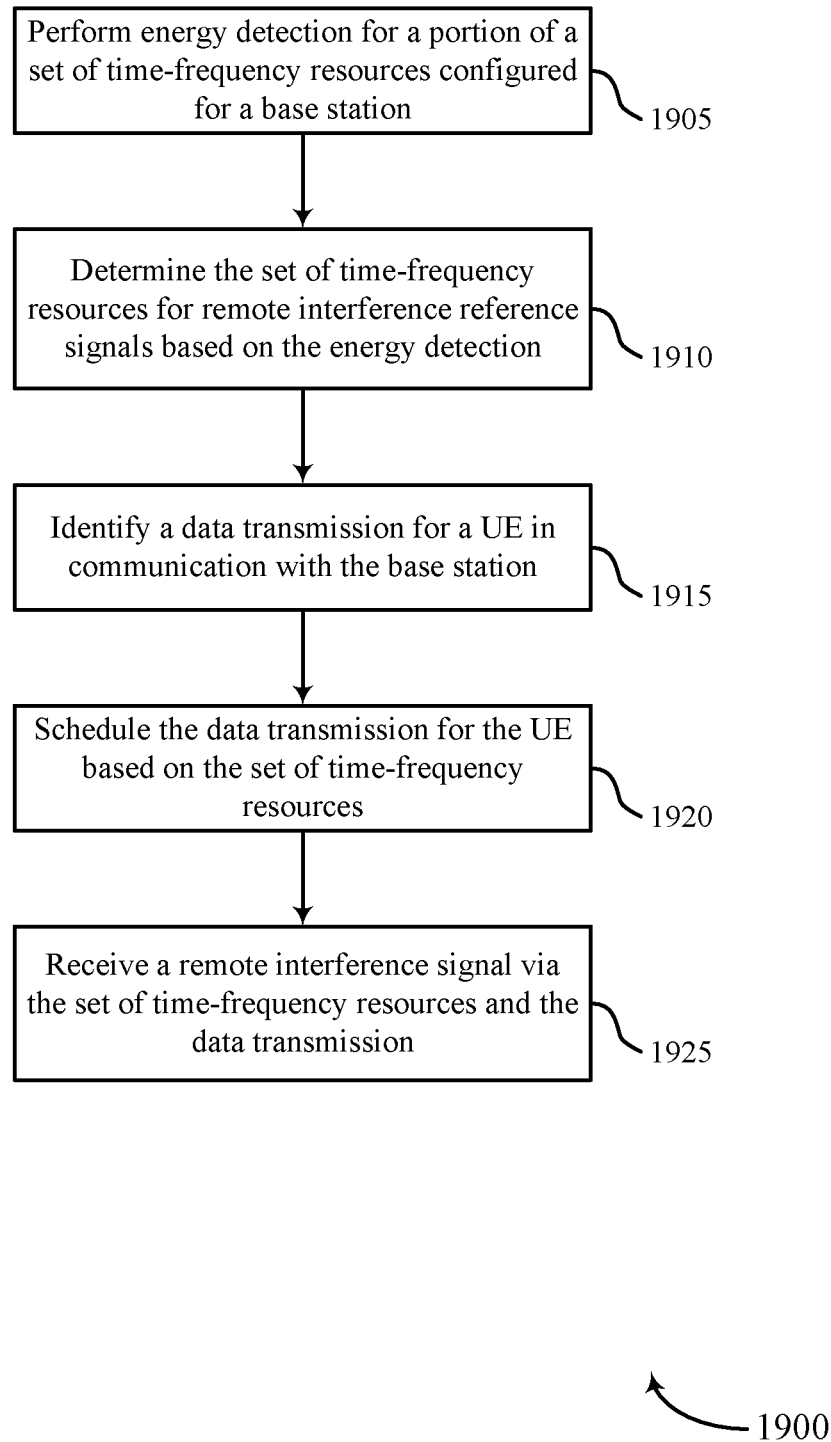

FIG. 19 shows a flowchart illustrating a method 1900 that supports interference mitigation for remote devices in accordance with various aspects of the present disclosure. The operations of method 1900 may be implemented by a base station or its components as described herein. For example, the operations of method 1900 may be performed by a remote interference manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 1905, the base station may perform energy detection for a portion of a set of time-frequency resources configured for the base station. The operations of 1905 may be performed according to the methods described herein. In some examples, aspects of the operations of 1905 may be performed by an energy detector as described with reference to FIGS. 11 through 14.

At 1910, the base station may determine the set of time-frequency resources for remote interference reference signals based on the energy detection. The operations of 1910 may be performed according to the methods described herein. In some examples, aspects of the operations of 1910 may be performed by a resource identifier as described with reference to FIGS. 11 through 14.

At 1915, the base station may identify a data transmission for a UE in communication with the base station. The operations of 1915 may be performed according to the methods described herein. In some examples, aspects of the operations of 1915 may be performed by a data component as described with reference to FIGS. 11 through 14.

At 1920, the base station may schedule the data transmission for the UE based on the set of time-frequency resources. The operations of 1920 may be performed according to the methods described herein. In some examples, aspects of the operations of 1920 may be performed by a scheduler as described with reference to FIGS. 11 through 14.

At 1925, the base station may receive a remote interference signal via the set of time-frequency resources and the data transmission. The operations of 1925 may be performed according to the methods described herein. In some examples, aspects of the operations of 1925 may be performed by a reception component as described with reference to FIGS. 11 through 14.

Figure 20:
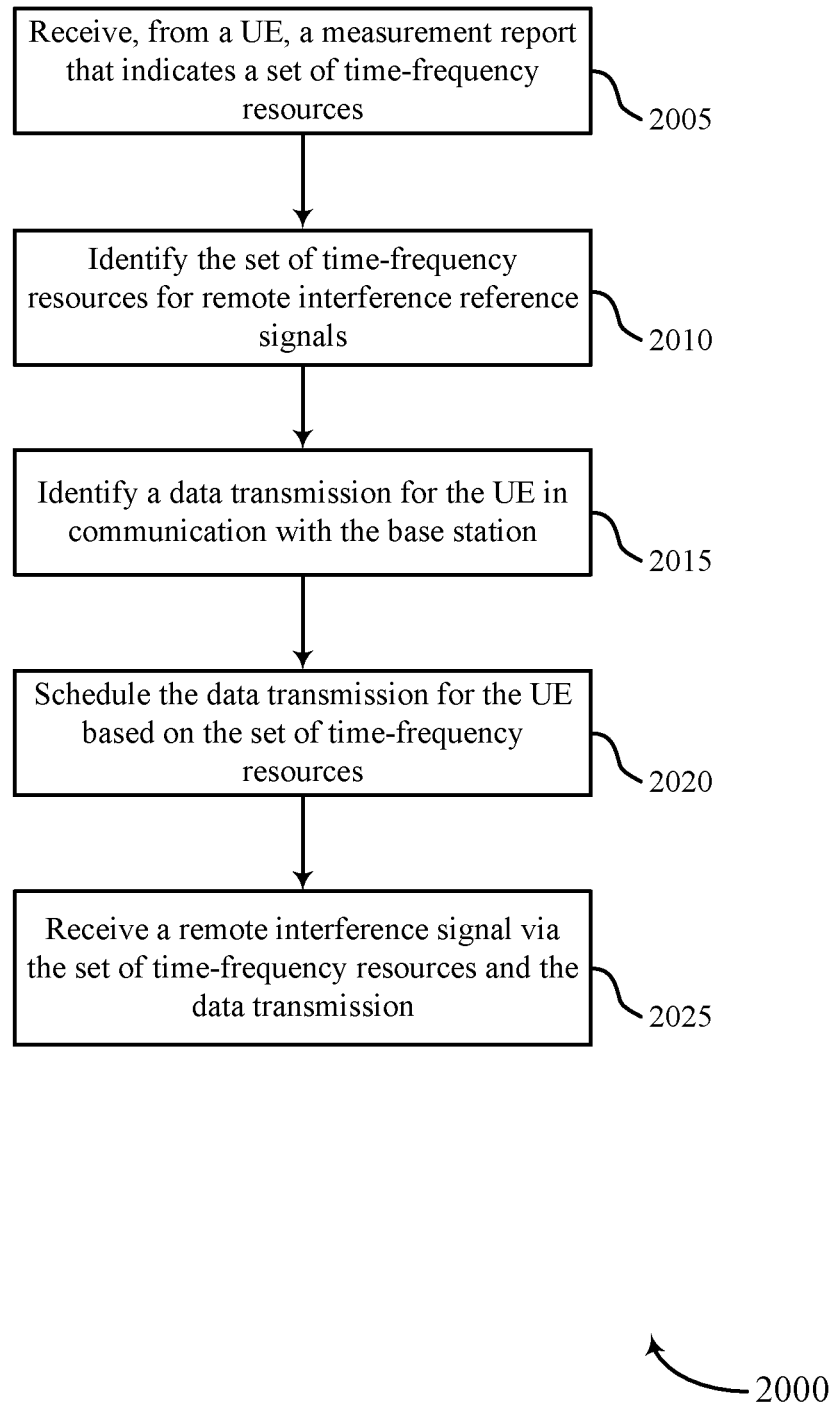

FIG. 20 shows a flowchart illustrating a method 2000 that supports interference mitigation for remote devices in accordance with various aspects of the present disclosure. The operations of method 2000 may be implemented by a base station or its components as described herein. For example, the operations of method 2000 may be performed by a remote interference manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 2005, the base station may receive, from the UE, a measurement report that indicates a set of time-frequency resources. The operations of 2005 may be performed according to the methods described herein. In some examples, aspects of the operations of 2005 may be performed by a reception component as described with reference to FIGS. 11 through 14.

At 2010, the base station may identify the set of time-frequency resources for remote interference reference signals (e.g., based on the measurement report received at 2005). The operations of 2010 may be performed according to the methods described herein. In some examples, aspects of the operations of 2010 may be performed by a resource identifier as described with reference to FIGS. 11 through 14.

At 2015, the base station may identify a data transmission for the UE in communication with the base station. The operations of 2015 may be performed according to the methods described herein. In some examples, aspects of the operations of 2015 may be performed by a data component as described with reference to FIGS. 11 through 14.

At 2020, the base station may schedule the data transmission for the UE based on the set of time-frequency resources. The operations of 2020 may be performed according to the methods described herein. In some examples, aspects of the operations of 2020 may be performed by a scheduler as described with reference to FIGS. 11 through 14.

At 2025, the base station may receive a remote interference signal via the set of time-frequency resources and the data transmission. The operations of 2025 may be performed according to the methods described herein. In some examples, aspects of the operations of 2025 may be performed by a reception component as described with reference to FIGS. 11 through 14.

Figure 21:
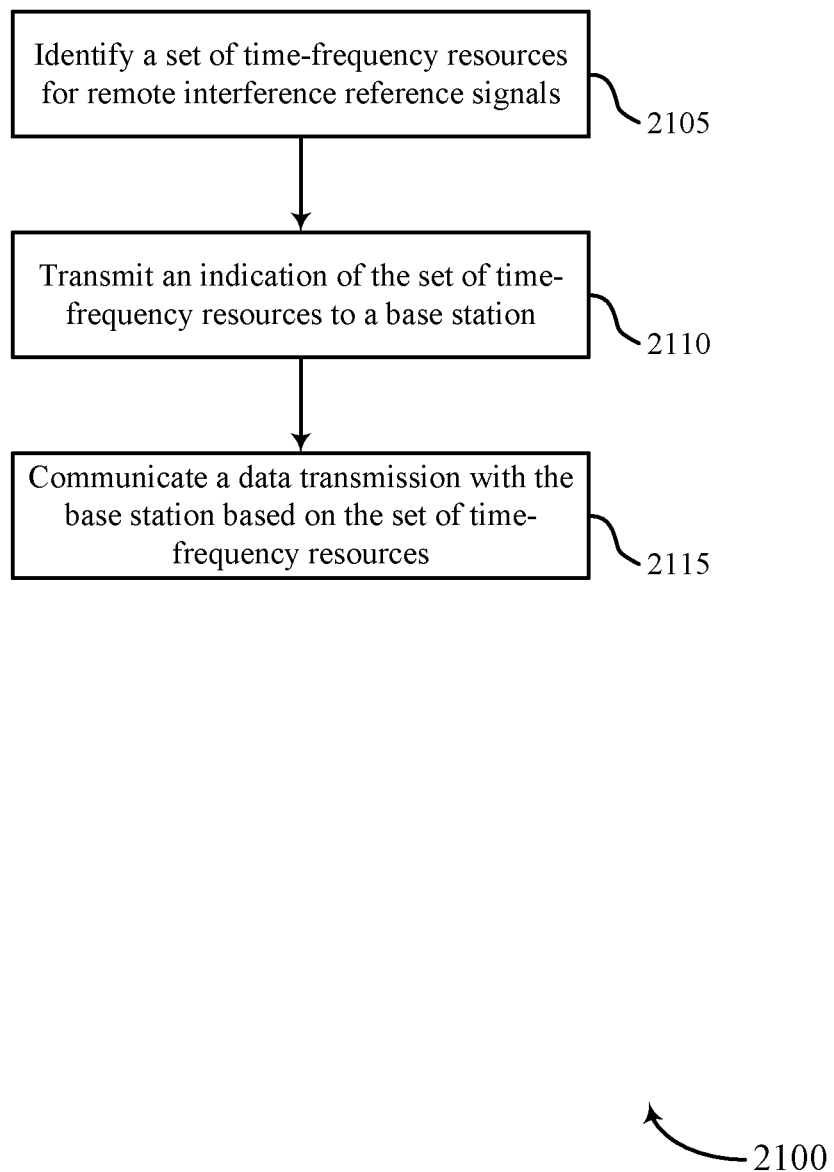

FIG. 21 shows a flowchart illustrating a method 2100 that supports interference mitigation for remote devices in accordance with various aspects of the present disclosure. The operations of method 2100 may be implemented by a UE or its components as described herein. For example, the operations of method 2100 may be performed by a remote interference manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 2105, the UE may identify a set of time-frequency resources for remote interference reference signals. The operations of 2105 may be performed according to the methods described herein. In some examples, aspects of the operations of 2105 may be performed by an interference component as described with reference to FIGS. 7 through 10.

At 2110, the UE may transmit an indication of the set of time-frequency resources to a base station. The operations of 2110 may be performed according to the methods described herein. In some examples, aspects of the operations of 2110 may be performed by an indication transmitter as described with reference to FIGS. 7 through 10.

At 2115, the UE may communicate a data transmission with the base station based on the set of time-frequency resources. The operations of 2115 may be performed according to the methods described herein. In some examples, aspects of the operations of 2115 may be performed by a communication component as described with reference to FIGS. 7 through 10.

Figure 22:
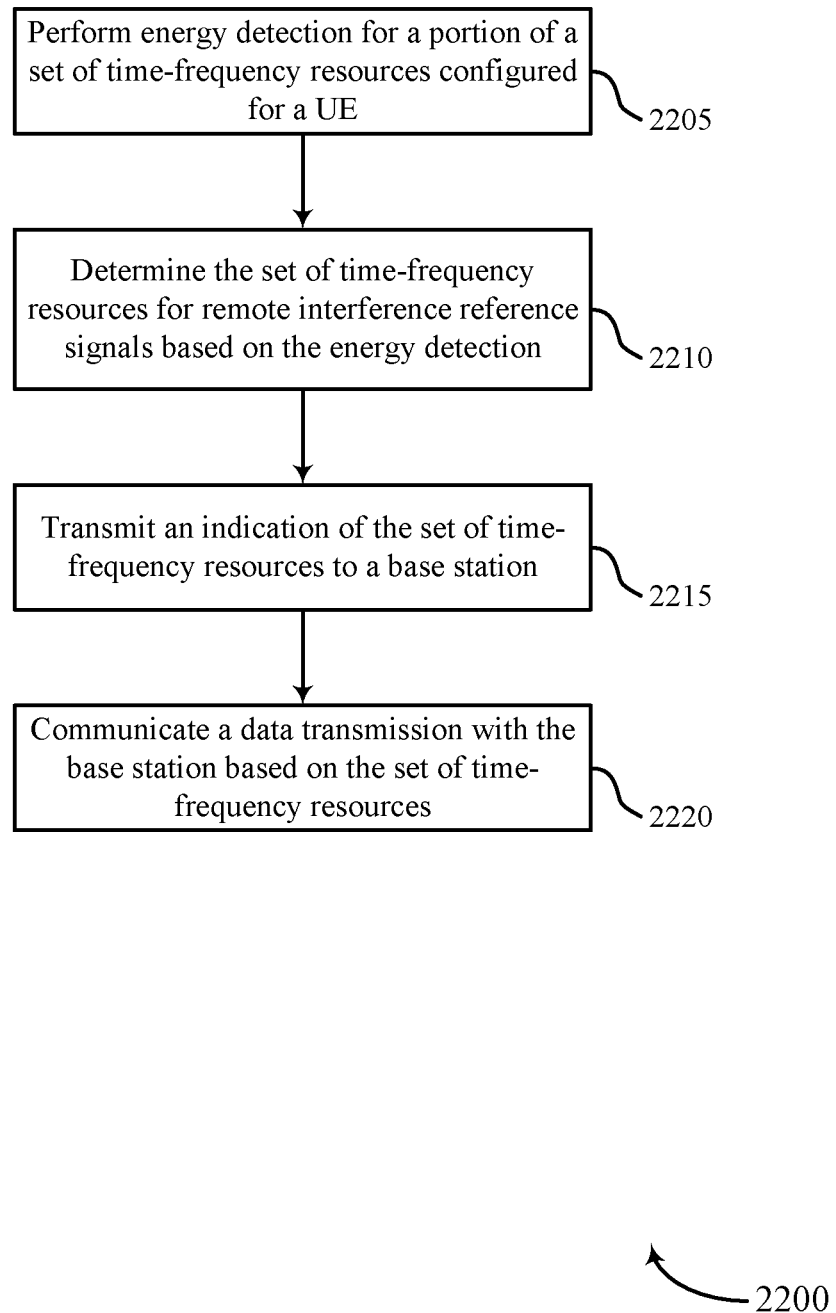

FIG. 22 shows a flowchart illustrating a method 2200 that supports interference mitigation for remote devices in accordance with various aspects of the present disclosure. The operations of method 2200 may be implemented by a UE or its components as described herein. For example, the operations of method 2200 may be performed by a remote interference manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 2205, the UE may perform energy detection for a portion of a set of time-frequency resources configured for the UE. The operations of 2205 may be performed according to the methods described herein. In some examples, aspects of the operations of 2205 may be performed by an energy detection component as described with reference to FIGS. 7 through 10.

At 2210, the UE may determine the set of time-frequency resources for remote interference reference signals based on the energy detection. The operations of 2210 may be performed according to the methods described herein. In some examples, aspects of the operations of 2210 may be performed by an interference component as described with reference to FIGS. 7 through 10.

At 2215, the UE may transmit an indication of the set of time-frequency resources to a base station. The operations of 2215 may be performed according to the methods described herein. In some examples, aspects of the operations of 2215 may be performed by an indication transmitter as described with reference to FIGS. 7 through 10.

At 2220, the UE may communicate a data transmission with the base station based on the set of time-frequency resources. The operations of 2220 may be performed according to the methods described herein. In some examples, aspects of the operations of 2220 may be performed by a communication component as described with reference to FIGS. 7 through 10.

Figure 23:
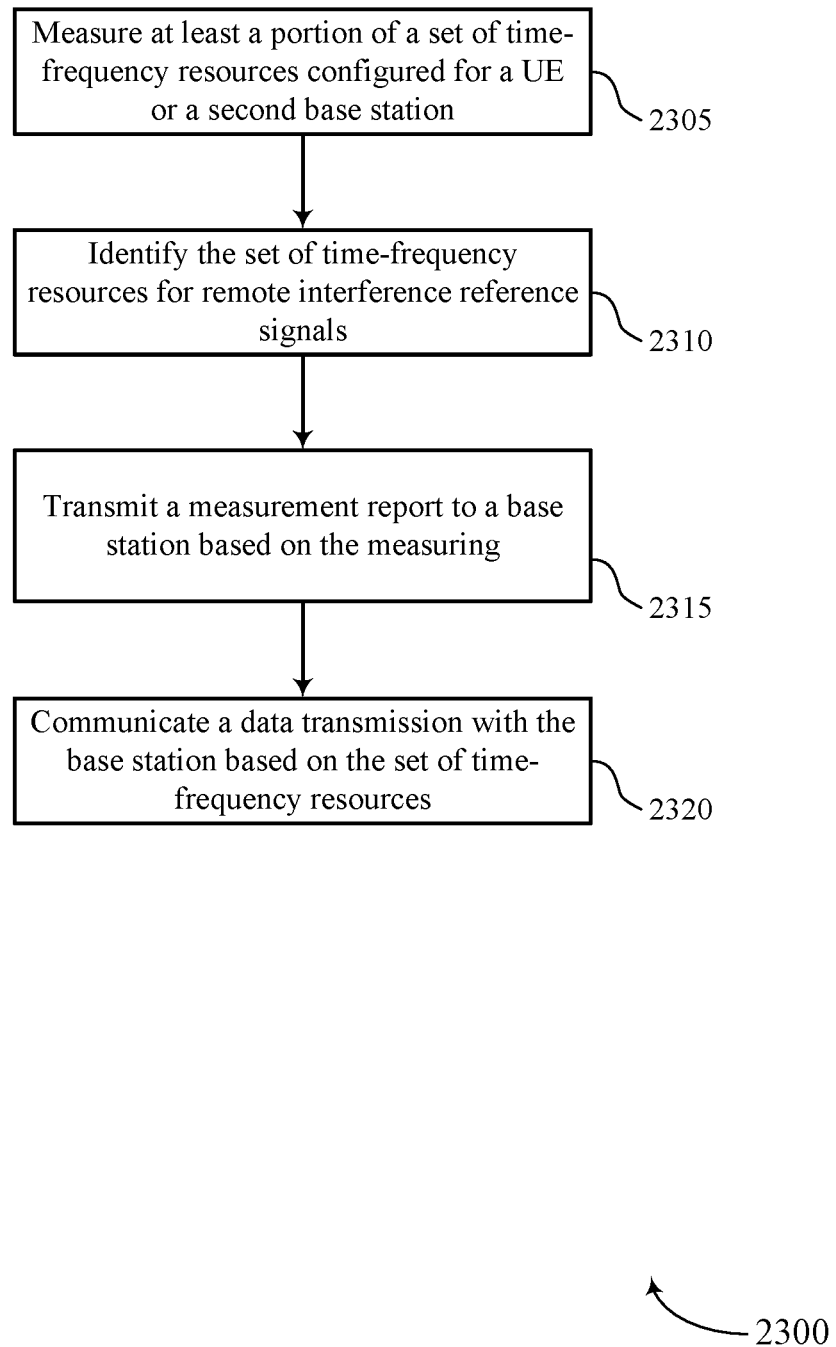

FIG. 23 shows a flowchart illustrating a method 2300 that supports interference mitigation for remote devices in accordance with various aspects of the present disclosure. The operations of method 2300 may be implemented by a UE or its components as described herein. For example, the operations of method 2300 may be performed by a remote interference manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 2305, the UE may measure at least a portion of a set of time-frequency resources configured for the UE or a second base station (e.g., a base station other than a serving base station for the UE). The operations of 2305 may be performed according to the methods described herein. In some examples, aspects of the operations of 2305 may be performed by a measurement component as described with reference to FIGS. 7 through 10.

At 2310, the UE may identify the set of time-frequency resources for remote interference reference signals. The operations of 2310 may be performed according to the methods described herein. In some examples, aspects of the operations of 2310 may be performed by an interference component as described with reference to FIGS. 7 through 10.

At 2315, the UE may transmit a measurement report to a base station (e.g., a serving base station) based on the measuring, where the measurement report may include the indication of the set of time-frequency resources. The operations of 2315 may be performed according to the methods described herein. In some examples, aspects of the operations of 2315 may be performed by a report component as described with reference to FIGS. 7 through 10.

At 2320, the UE may communicate a data transmission with the base station based on the set of time-frequency resources. The operations of 2320 may be performed according to the methods described herein. In some examples, aspects of the operations of 2320 may be performed by a communication component as described with reference to FIGS. 7 through 10.

Figure 24:
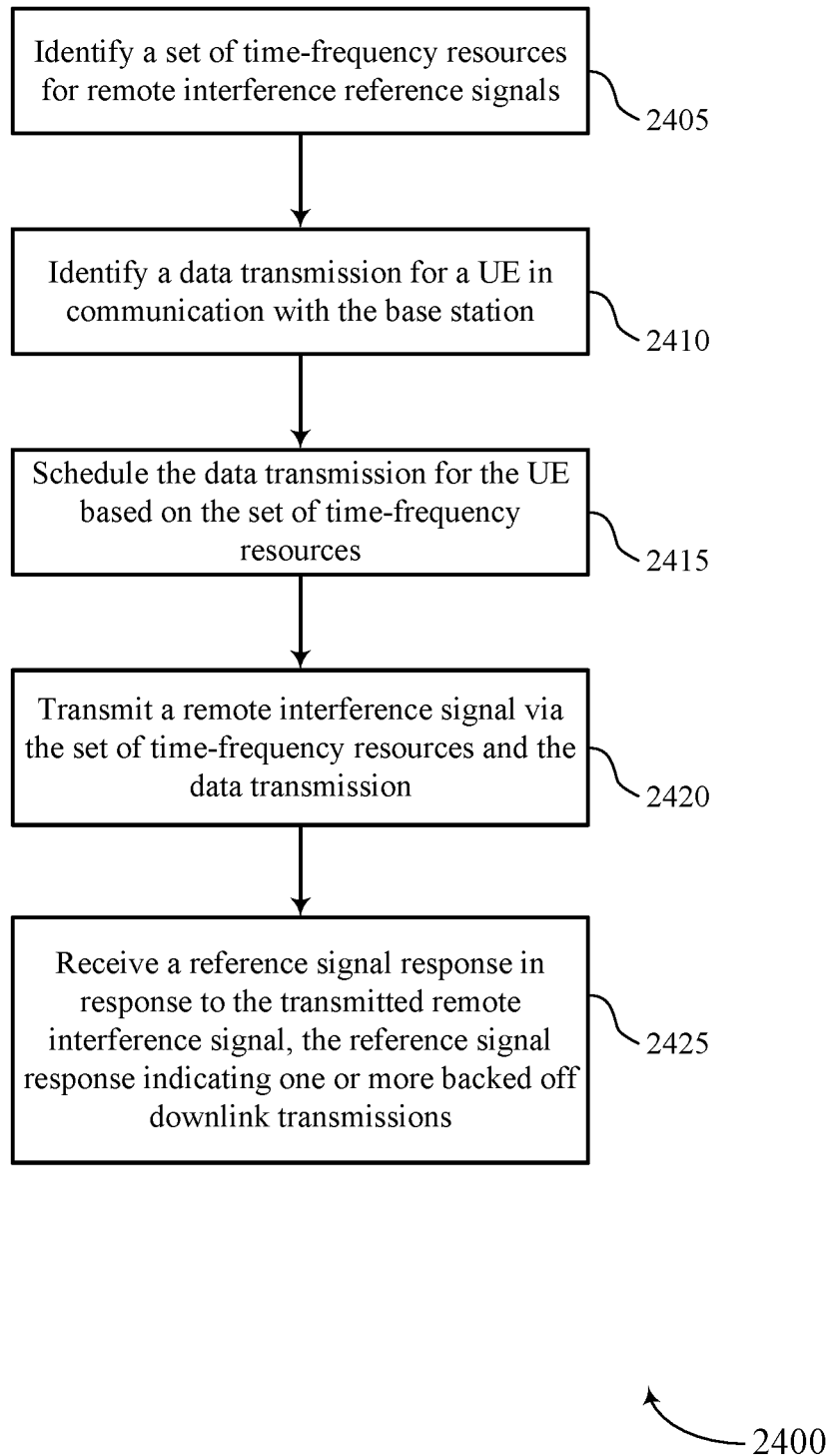

FIG. 24 shows a flowchart illustrating a method 2400 that supports interference mitigation for remote devices in accordance with various aspects of the present disclosure. The operations of method 2400 may be implemented by a base station or its components as described herein. For example, the operations of method 2400 may be performed by a remote interference manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 2405, the base station may identify a set of time-frequency resources for remote interference reference signals. The operations of 2405 may be performed according to the methods described herein. In some examples, aspects of the operations of 2405 may be performed by a resource identifier as described with reference to FIGS. 11 through 14.

At 2410, the base station may identify a data transmission for a UE in communication with the base station. The operations of 2410 may be performed according to the methods described herein. In some examples, aspects of the operations of 2410 may be performed by a data component as described with reference to FIGS. 11 through 14.

At 2415, the base station may schedule the data transmission for the UE based on the set of time-frequency resources. The operations of 2415 may be performed according to the methods described herein. In some examples, aspects of the operations of 2415 may be performed by a scheduler as described with reference to FIGS. 11 through 14.

At 2420, the base station may transmit a remote interference signal via the set of time-frequency resources and the data transmission. The operations of 2420 may be performed according to the methods described herein. In some examples, aspects of the operations of 1520 may be performed by a transmission component as described with reference to FIGS. 11 through 14.

At 2425, the base station may receive, from a second base station, a reference signal response in response to the transmitted remote interference signal, the reference signal response indicating one or more backed off downlink transmissions. The operations of 2425 may be performed according to the methods described herein. In some examples, aspects of the operations of 2425 may be performed by a reception component as described with reference to FIGS. 11 through 14.

Figure 25:
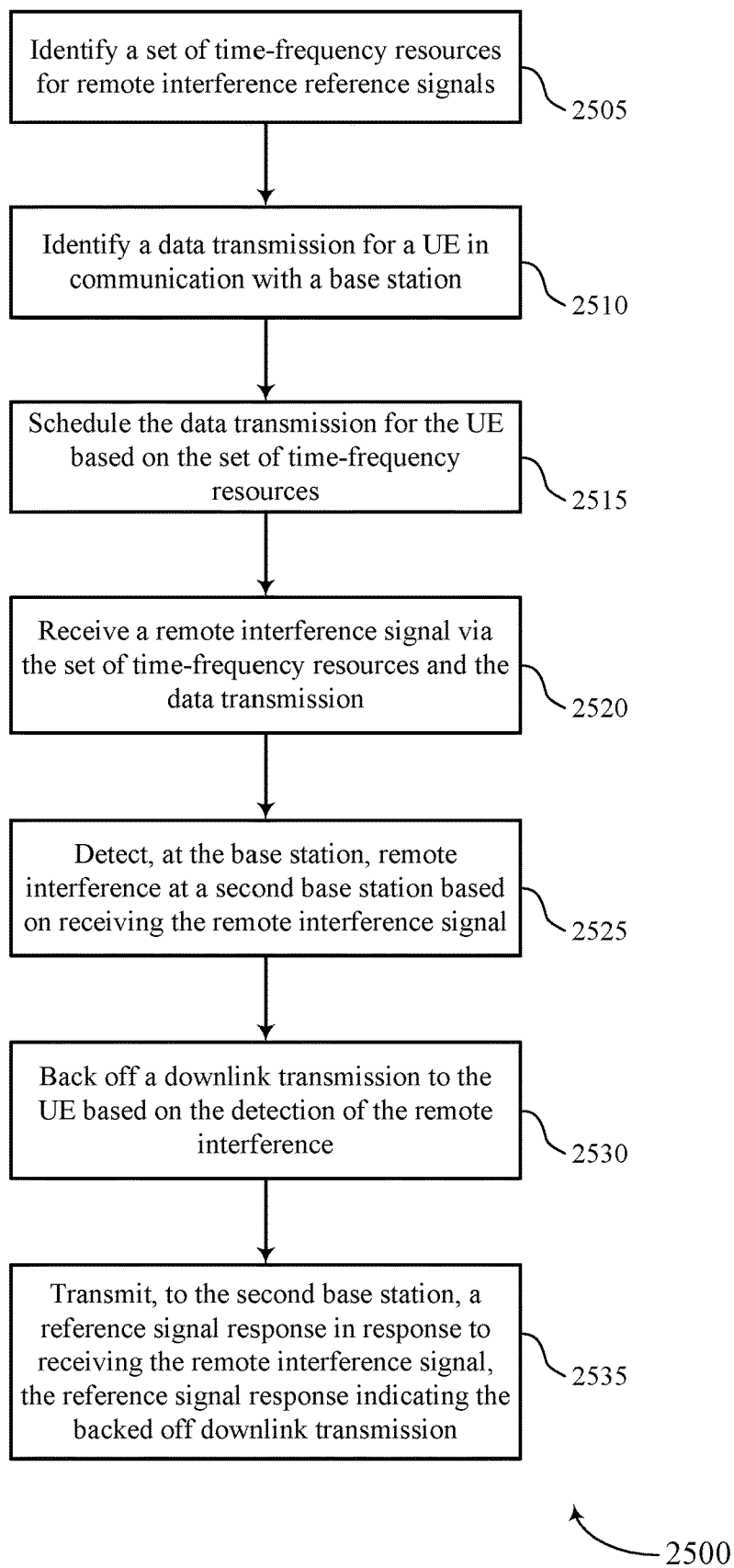

FIG. 25 shows a flowchart illustrating a method 2500 that supports interference mitigation for remote devices in accordance with various aspects of the present disclosure. The operations of method 2500 may be implemented by a base station or its components as described herein. For example, the operations of method 2500 may be performed by a remote interference manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 2505, the base station may identify a set of time-frequency resources for remote interference reference signals. The operations of 2505 may be performed according to the methods described herein. In some examples, aspects of the operations of 2505 may be performed by a resource identifier as described with reference to FIGS. 11 through 14.

At 2510, the base station may identify a data transmission for a UE in communication with the base station. The operations of 2510 may be performed according to the methods described herein. In some examples, aspects of the operations of 2510 may be performed by a data component as described with reference to FIGS. 11 through 14.

At 2515, the base station may schedule the data transmission for the UE based on the set of time-frequency resources. The operations of 2515 may be performed according to the methods described herein. In some examples, aspects of the operations of 2515 may be performed by a scheduler as described with reference to FIGS. 11 through 14.

At 2520, the base station may receive a remote interference signal via the set of time-frequency resources and the data transmission. The operations of 2520 may be performed according to the methods described herein. In some examples, aspects of the operations of 2520 may be performed by a reception component as described with reference to FIGS. 11 through 14.

At 2525, the base station may detect, at the base station, remote interference at a second base station based on receiving the remote interference signal. The operations of 2525 may be performed according to the methods described herein. In some examples, aspects of the operations of 2520 may be performed by a detection component as described with reference to FIGS. 11 through 14.

At 2530, the base station may back off a downlink transmission to the UE based on the detection of the remote interference. The operations of 2530 may be performed according to the methods described herein. In some examples, aspects of the operations of 2530 may be performed by a backoff component as described with reference to FIGS. 11 through 14.

At 2535, the base station may transmit, to the second base station, a reference signal response in response to receiving the remote interference signal, the reference signal response indicating the backed off downlink transmission. The operations of 2535 may be performed according to the methods described herein. In some examples, aspects of the operations of 2535 may be performed by a reception component as described with reference to FIGS. 11 through 14.

Described herein are a number of examples of methods, systems or apparatuses including means for implementing methods or realizing apparatuses, non-transitory computer-readable medium storing instructions executable by one or more processors to cause the one or more processors to implement methods, and systems including one or more processors and memory in electronic communication with the one or more processors storing instructions executable by the one or more processors to cause the system or apparatus to implement methods. It is to be understood that these are just some examples of possible implementations, and other examples will be readily apparent to those skilled in the art without departing from the scope of the disclosure.

Example 1 is a method of wireless communications that includes identifying a set of time-frequency resources for remote interference reference signals, identifying a data transmission for a UE in communication with the base station, scheduling the data transmission for the UE based on the set of time-frequency resources, and transmitting a remote interference signal via the set of time-frequency resources and the data transmission. In Example 2, the identifying the set of time-frequency resources of Example 1 includes receiving, from a central controller, an indication of the set of time-frequency resources configured for remote interference reference signals. In Example 3, the method of either of Examples 1 or 2 further includes where the set of time-frequency resources span one or more frequency sub-bands and one or more symbols.

In Example 4, the identifying the set of time-frequency resources of any of Examples 1-3 includes receiving signaling from a second base station, and determining the set of time-frequency resources for remote interference reference signals based on the signaling. In Example 5, the method of any of Examples 1-4 further includes where the signaling may be received via a backhaul communication link between the base station and the second base station. In Example 6, the identifying the set of time-frequency resources of any of Examples 1-5 includes performing energy detection for a portion of the set of time-frequency resources configured for the base station, and determining the set of time-frequency resources for remote interference reference signals based on the energy detection. In Example 7, the identifying the set of time-frequency resources of any of Examples 1-6 includes receiving, from the UE, a measurement report that indicates the set of time-frequency resources.

In Example 8, the method of any of Examples 1-7 further includes transmitting, to the UE, an indication of the scheduling via RRC signaling or DCI. In Example 9, the scheduling of any of Examples 1-8 includes scheduling the data transmission in resources around the set of time-frequency resources. In Example 10, the method of any of Examples 1-9 further includes detecting, at the base station, remote interference from a second base station, and transmitting the remote interference signal based on detection of the remote interference from the second base station. In Example 11, the detecting remote interference of any of Examples 1-10 includes detecting an interference over thermal noise level of a signal from the second base station, the interference over thermal noise level associated with an interference level greater than an interference threshold. In Example 12, the method of any of Examples 1-11 further includes receiving, from a second base station, a reference signal response in response to the transmitted remote interference signal, the reference signal response indicating one or more backed off downlink transmissions.

In Example 13, the method of any of Examples 1-12 further includes where the reference signal response may be based on a distance between the base station and the second base station. In Example 14, the method of any of Examples 1-15 further includes where the set of time-frequency resources may be allocated to a group of base stations including the base station. Example 15 is a system or apparatus including means for implementing a method or realizing an apparatus as in any of examples 1-14. Example 16 is a system including one or more processors and memory in electronic communication with the one or more processors storing instructions executable by the one or more processors to cause the system or apparatus to implement a method as in any of examples 1-14. Example 17 is a non-transitory computer-readable medium storing instructions executable by one or more processors to cause the one or more processors to implement a method as in any of examples 1-14.

Example 18 is a method of wireless communications that includes identifying a set of time-frequency resources for remote interference reference signals, identifying a data transmission for a UE in communication with the base station, scheduling the data transmission for the UE based on the set of time-frequency resources, and receiving a remote interference signal via the set of time-frequency resources and the data transmission. In Example 19, the identifying the set of time-frequency resources of Example 18 includes receiving, from a central controller, an indication of the set of time-frequency resources configured for remote interference reference signals. In Example 20, the method of either of Examples 18 or 19 further includes where the set of time-frequency resources span one or more frequency sub-bands and one or more symbols. In Example 21, the identifying the set of time-frequency resources of any of Examples 18-20 includes receiving signaling from a second base station, and determining the set of time-frequency resources for remote interference reference signals based on the signaling.

In Example 22, the identifying the set of time-frequency resources of any of Examples 18-21 includes performing energy detection for a portion of the set of time-frequency resources configured for the base station, and determining the set of time-frequency resources for remote interference reference signals based on the energy detection. In Example 23, the identifying the set of time-frequency resources of any of Examples 18-22 includes receiving, from the UE, a measurement report that indicates the set of time-frequency resources. In Example 24, the scheduling of any of Examples 18-23 includes scheduling the data transmission in resources non-overlapping with the set of time-frequency resources. In Example 25, the method of any of Examples 18-24 further includes detecting, at the base station, remote interference at a second base station based on receiving the remote interference signal, and backing off a downlink transmission to the UE based on the detection of the remote interference.

In Example 26, the method of any of Examples 18-25 further includes transmitting, to the second base station, a reference signal response in response to receiving the remote interference signal, the reference signal response indicating the backed off downlink transmission. In Example 27, the method of any of Examples 18-26 further includes where the reference signal response may be based on a distance between the base station and the second base station. In Example 28, the method of any of Examples 18-27 further includes where the set of time-frequency resources may be allocated to a group of base stations including the base station. In Example 29, the method of any of Examples 18-28 further includes where the reference signal response may be based on a distance between the base station and the second base station. In Example 30, the method of any of Examples 18-28 further includes where the set of time-frequency resources may be allocated to a group of base stations including the base station.

Example 31 is a system or apparatus including means for implementing a method or realizing an apparatus as in any of examples 18-28. Example 32 is a method of wireless communications that includes identifying a set of time-frequency resources for remote interference reference signals, transmitting an indication of the set of time-frequency resources to a base station, and communicating a data transmission with the base station based on the set of time-frequency resources. In Example 33, the identifying the set of time-frequency resources of Example 32 includes performing energy detection for a portion of the set of time-frequency resources configured for the UE, and determining the set of time-frequency resources for remote interference reference signals based on the energy detection. In Example 34, the method of either of Examples 32 or 33 further includes measuring at least a portion of the set of time-frequency resources configured for the UE or a second base station and transmitting a measurement report to the base station based on the measuring, where the measurement report includes the indication of the set of time-frequency resources.

In Example 35, the method of any of Examples 32-34 further includes receiving, from the base station, an indication of scheduling of the data transmission via RRC signaling or DCI. In Example 36, the communicating the data transmission with the base station of any of Examples 32-35 includes receiving the data transmission scheduled around the set of time-frequency resources. In Example 37, the communicating the data transmission with the base station of any of Examples 32-36 transmitting an uplink transmission to the base station via resources that may be non-overlapping with the set of time-frequency resources. In Example 38, the method of any of Examples 32-37 further includes where the reference signal response may be based on a distance between the base station and the second base station. In Example 39, the method of any of Examples 32-37 further includes where the set of time-frequency resources may be allocated to a group of base stations including the base station. Example 40 is a system or apparatus including means for implementing a method or realizing an apparatus as in any of examples 32-37.

Aspects of these examples may be combined with aspects or embodiments disclosed in other implementations.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code-division multiple access (CDMA), time-division multiple access (TDMA), frequency-division multiple access (FDMA), orthogonal frequency-division multiple access (OFDMA), single-carrier FDMA (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell may cover a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (licensed, unlicensed, etc.) frequency spectrum bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a network entity, comprising:
   identifying a set of time-frequency resources for remote interference reference signals;
   identifying a data transmission for a user equipment (UE) in communication with the network entity;
   scheduling the data transmission for the UE based at least in part on the set of time-frequency resources; and
   transmitting a remote interference signal via the set of time-frequency resources and the data transmission.

2. The method of claim 1, wherein identifying the set of time-frequency resources comprises:
   receiving, from a central controller, an indication of the set of time-frequency resources configured for remote interference reference signals.

3. The method of claim 2, wherein the set of time-frequency resources span one or more frequency sub-bands and one or more symbols.

4. The method of claim 1, wherein identifying the set of time-frequency resources comprises:
   receiving signaling from a second network entity; and
   determining the set of time-frequency resources for remote interference reference signals based at least in part on the signaling.

5. The method of claim 4, wherein the signaling is received via a backhaul communication link between the network entity and the second network entity.

6. The method of claim 1, wherein identifying the set of time-frequency resources comprises:
   performing energy detection for a portion of the set of time-frequency resources configured for the network entity; and
   determining the set of time-frequency resources for remote interference reference signals based at least in part on the energy detection.

7. The method of claim 1, wherein identifying the set of time-frequency resources comprises:
   receiving, from the UE, a measurement report that indicates the set of time-frequency resources.

8. The method of claim 1, further comprising:
   transmitting, to the UE, an indication of the scheduling via radio resource control (RRC) signaling or downlink control information (DCI).

9. The method of claim 1, wherein scheduling comprises:
   scheduling the data transmission in resources around the set of time-frequency resources.

10. The method of claim 1, further comprising:
    detecting, at the network entity, remote interference from a second network entity, wherein the detecting comprises detecting an interference over thermal noise level of a signal from the second network entity, the interference over thermal noise level associated with an interference level greater than an interference threshold; and
    transmitting at least in part on detection of the remote interference from the second network entity.

11. The method of claim 1, further comprising:
    receiving, from a second network entity, a reference signal response in response to the transmitted remote interference signal, the reference signal response indicating one or more backed off downlink transmissions.

12. The method of claim 11, wherein the reference signal response is based at least in part on a distance between the network entity and the second network entity.

13. The method of claim 1, wherein the set of time-frequency resources is allocated to a group of network entities including the network entity.

14. A method for wireless communications at a network entity, comprising:
    identifying a set of time-frequency resources for remote interference reference signals;
    identifying a data transmission for a user equipment (UE) in communication with the network entity;
    scheduling the data transmission for the UE based at least in part on the set of time-frequency resources; and
    receiving a remote interference signal via the set of time-frequency resources and the data transmission.

15. The method of claim 14, wherein identifying the set of time-frequency resources comprises:
    receiving, from a central controller, an indication of the set of time-frequency resources configured for remote interference reference signals.

16. The method of claim 15, wherein the set of time-frequency resources span one or more frequency sub-bands and one or more symbols.

17. The method of claim 14, wherein identifying the set of time-frequency resources comprises:
    receiving signaling from a second network entity; and
    determining the set of time-frequency resources for remote interference reference signals based at least in part on the signaling.

18. The method of claim 14, wherein identifying the set of time-frequency resources comprises:
    performing energy detection for a portion of the set of time-frequency resources configured for the network entity; and
    determining the set of time-frequency resources for remote interference reference signals based at least in part on the energy detection.

19. The method of claim 14, wherein identifying the set of time-frequency resources comprises:
receiving, from the UE, a measurement report that indicates the set of time-frequency resources.

20. The method of claim 14, wherein scheduling comprises:
scheduling the data transmission in resources non-overlapping with the set of time-frequency resources.

21. The method of claim 14, further comprising:
detecting, at the network entity, remote interference at a second network entity based at least in part on receiving the remote interference signal; and
backing off a downlink transmission to the UE based at least in part on the detection of the remote interference.

22. The method of claim 21, further comprising:
transmitting, to the second network entity, a reference signal response in response to receiving the remote interference signal, the reference signal response indicating the backed off downlink transmission.

23. An apparatus for wireless communications at a network entity, comprising:
one or more processors; and
instructions stored in one or more memories and executable by the one or more processors, individually or collectively, to cause the apparatus to:
identify a set of time-frequency resources for remote interference reference signals;
identify a data transmission for a user equipment (UE) in communication with the network entity;
schedule the data transmission for the UE based at least in part on the set of time-frequency resources; and
transmit a remote interference signal via the set of time-frequency resources and the data transmission.

24. The network entity of claim 23, wherein, to identify the set of time-frequency resources, the instructions are executable by the one or more processors, individually or collectively, to cause the apparatus to:
receive, from a central controller, an indication of the set of time-frequency resources configured for remote interference reference signals.

25. The network entity of claim 23, wherein, to identify the set of time-frequency resources, the instructions are executable by the one or more processors, individually or collectively, to cause the apparatus to:
receive signaling from a second network entity; and
determine the set of time-frequency resources for remote interference reference signals based at least in part on the signaling.

26. The network entity of claim 23, wherein, to identify the set of time-frequency resources, the instructions are executable by the one or more processors, individually or collectively, to cause the apparatus to:
perform energy detection for a portion of the set of time-frequency resources configured for the network entity; and
determine the set of time-frequency resources for remote interference reference signals based at least in part on the energy detection.

27. The network entity of claim 23, wherein, to identify the set of time-frequency resources, the instructions are executable by the one or more processors, individually or collectively, to cause the apparatus to:
receive, from the UE, a measurement report that indicates the set of time-frequency resources.

28. An apparatus for wireless communications at a network entity, comprising:
one or more processors; and
instructions stored in one or more memories and executable by the one or more processors, individually or collectively, to cause the apparatus to:
identify a set of time-frequency resources for remote interference reference signals;
identify a data transmission for a user equipment (UE) in communication with the network entity;
schedule the data transmission for the UE based at least in part on the set of time-frequency resources; and
receive a remote interference signal via the set of time-frequency resources and the data transmission.

29. The network entity of claim 28, wherein, to identify the set of time-frequency resources, the instructions are executable by the one or more processors, individually or collectively, to cause the apparatus to:
receive, from a central controller, an indication of the set of time-frequency resources configured for remote interference reference signals.

30. The network entity of claim 28, wherein, to identify the set of time-frequency resources, the instructions are executable by the one or more processors, individually or collectively, to cause the apparatus to:
receive signaling from a second network entity; and
determine the set of time-frequency resources for remote interference reference signals based at least in part on the signaling.

* * * * *